US012580316B2

(12) United States Patent
Schmidhammer et al.

(10) Patent No.: US 12,580,316 B2
(45) Date of Patent: Mar. 17, 2026

(54) MULTI-COMMUNICATION DEVICE ANTENNA INTERFACE

(71) Applicant: QUALCOMM Incorporated, San Diego, CA (US)

(72) Inventors: Edgar Konrad Schmidhammer, Stein an der Traun (DE); Juha Sakari Ella, Turku (FI)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 18/806,539

(22) Filed: Aug. 15, 2024

(65) Prior Publication Data

US 2026/0051659 A1 Feb. 19, 2026

(51) Int. Cl.
*H01Q 9/28* (2006.01)
*H01Q 5/335* (2015.01)

(52) U.S. Cl.
CPC ............... *H01Q 9/28* (2013.01); *H01Q 5/335* (2015.01)

(58) Field of Classification Search
CPC ........ H01Q 21/28; H01Q 5/335; H01Q 1/243; H01Q 1/36; H01Q 21/30; H01Q 1/38; H01Q 1/521; H01Q 3/24; H01Q 1/2291; H01Q 1/50; H01Q 5/378; H01Q 1/2225
See application file for complete search history.

(56) References Cited

U.S. PATENT DOCUMENTS 8,964,605 B1 2/2015 Ansari
9,401,798 B1 7/2016 Signoff et al.
2005/0215205 A1 9/2005 Rofougaran
2014/0146718 A1 5/2014 Mikhemar et al.
2014/0306780 A1 10/2014 Lehtinen
2017/0125902 A1* 5/2017 Trojer .................. H04M 3/005
2018/0123202 A1* 5/2018 Suzuki ..................... H01P 5/10
2018/0343029 A1 11/2018 Zhang et al.
2019/0245520 A1 8/2019 Andersson
2022/0038122 A1 2/2022 Hur et al.
2022/0158343 A1* 5/2022 Hassan ................. H01Q 3/247
2023/0073267 A1 3/2023 Mesquita et al.
2023/0299741 A1 9/2023 Schmidhammer et al.
2025/0125789 A1* 4/2025 Tsai ......................... H01P 5/16

OTHER PUBLICATIONS

Sartori E., "Hybrid Transformers," IEEE Transactions on Parts, Materials and Packaging, vol. 4, No. 3, Sep. 1968, pp. 59-66.
International Search Report and Written Opinion—PCT/US2025/037506—ISA/EPO—Oct. 23, 2025.

* cited by examiner

*Primary Examiner* — Wei (Victor) Y Chan
(74) *Attorney, Agent, or Firm* — Loza & Loza LLP

(57) ABSTRACT

An apparatus, including: an antenna interface, comprising: a first transformer including a first transmission line coupled to a second transmission line, wherein the first transmission line includes first and second ends configured to couple to a first communication device and a reference potential electrode, respectively, and wherein the second transmission line includes first and second ends configured to couple to an antenna and a second communication device, respectively; and a second transformer including a third transmission line coupled to a fourth transmission line, wherein the third transmission line includes first and second ends configured to couple to the first communication device and the reference potential electrode, respectively, and wherein the fourth transmission line includes first and second ends configured to couple to the second communication device and a ballast load, respectively.

39 Claims, 14 Drawing Sheets

MULTI-COMMUNICATION DEVICE ANTENNA INTERFACE

FIELD

This disclosure relates generally to antenna interfaces, and in particular, to a multi-communication device antenna interface using coupled line transformers or Marchand baluns.

BACKGROUND

A wireless communication device may provide wireless communication services based on a number of different standards or protocols. For example, a wireless communication device may provide wireless wide area network (WWAN) communication services based on, for example, Long-Term Evolution (LTE) or fifth or sixth generation (5G) and (6G) New Radio (NR) protocols or standards. The same wireless communication device may also provide wireless local area network (WLAN) communication services based on, for example, various WiFi protocols or standards. Additionally, the same wireless communication device may provide ultra-wideband (UWB) communication services. These different concurrent wireless communication services operating simultaneously on a wireless communication device may pose operational hardware coexistence issues.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus, includes: an antenna interface, comprising: a first transformer including a first transmission line and a second transmission line coupled to the first transmission line, wherein the first transmission line includes first and second ends configured to couple to a first communication device and a reference potential electrode, respectively, and wherein the second transmission line includes first and second ends configured to couple to an antenna and a second communication device, respectively; and a second transformer including a third transmission line and a fourth transmission line coupled to the third transmission line, wherein the third transmission line includes first and second ends configured to couple to the first communication device and the reference potential electrode, respectively, and wherein the fourth transmission line includes first and second ends configured to couple to the second communication device and a ballast load, respectively.

Another aspect of the disclosure relates to an apparatus. The apparatus, includes: an antenna interface, including: a first Marchand balun including a first port that terminates at an open circuit, a second port configured to couple to a first communication device, a third port configured to couple to an antenna, and a fourth port configured to couple to a second communication device; and a second Marchand balun including a first port that terminates at an open circuit, a second port configured to couple to the first communication device, a third port configured to couple to the second communication device, and a fourth port configured to couple to a ballast load.

Another aspect of the disclosure relates to an apparatus. The apparatus, includes: an antenna interface including first, second, third, and fourth ports configured to couple to first, second, third, and fourth devices, respectively, the antenna interface comprising: a first transformer including a first primary winding and a first secondary winding, wherein the first primary winding includes first and second ends coupled to the third port and a reference potential electrode, respectively, and wherein the first secondary winding includes first and second ends coupled to the second port and the first port, respectively; and a second transformer including a second primary winding and a second secondary winding, wherein the second primary winding includes first and second ends coupled to the third port and the reference potential electrode, respectively, and wherein the second secondary winding includes first and second ends coupled to the first port and the fourth port, respectively.

Another aspect of the disclosure relates to an apparatus. The apparatus, includes: an antenna interface configured to couple to first, second, third, and fourth devices, the antenna interface comprising: a first Marchand balun including a first port that terminates at an open circuit, a second port configured to couple to the third device, a third port configured to couple to the second device, and a fourth port configured to couple to the first device; and a second Marchand balun including a first port that terminates at an open circuit, a second port configured to couple to the third device, a third port configured to couple to the first device, and a fourth port configured to couple to the fourth device.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. The term "substantially" means that the associated parameter may not be exact as indicated but accounts for some variation due to specified tolerances.

Small form-factor devices, such as mobile phones, may wirelessly communicate with other devices using several different protocols, such as wireless wide area networks (WWAN) (e.g., cellular networks, like 5G or 6G) protocols, wireless local area networks (WLAN) (e.g., WiFi) protocols, and ultra-wideband (UWB) protocols (e.g., car keyless entry). Such protocols may have different licensed and unlicensed frequency bands assigned to them for facilitating wireless communication.

Figure 1:
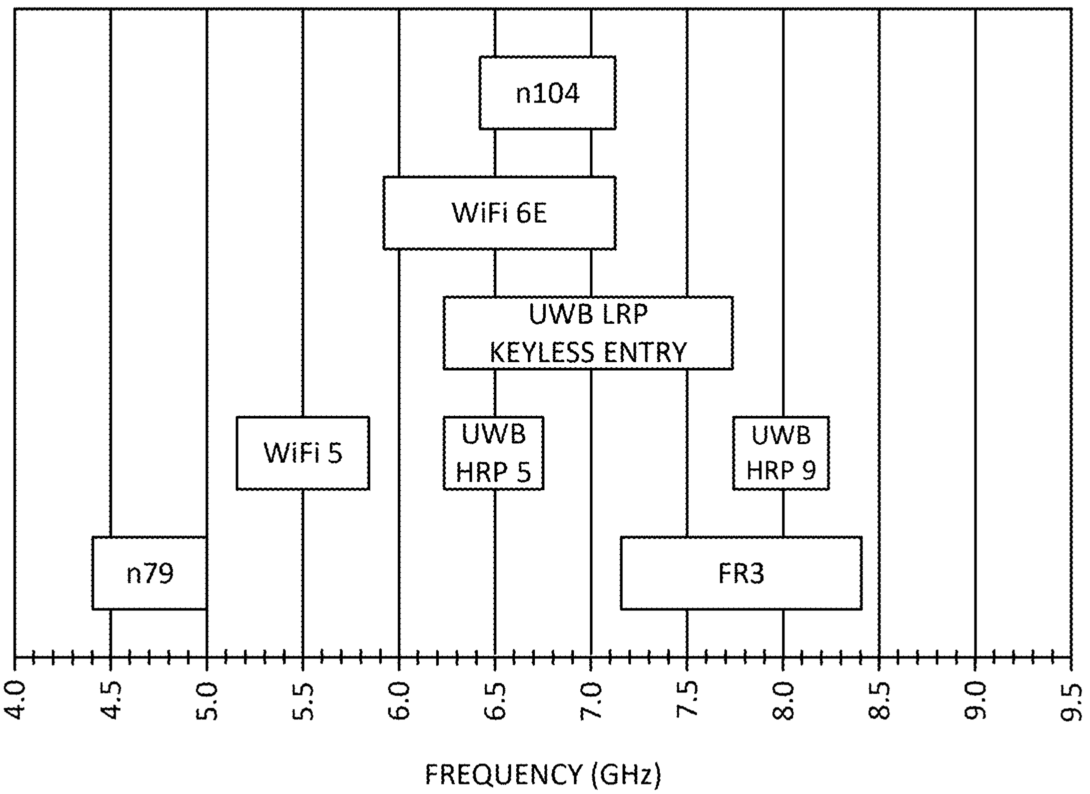
FIG. 1 illustrates a frequency spectrum graph of various wireless communication bands in accordance with an aspect of the disclosure.

FIG. 1 illustrates a frequency spectrum graph of various wireless communication bands assigned to WWAN, WLAN, and UWB protocols in accordance with an aspect of the disclosure. The horizontal axis of the graph represents frequency in giga Hertz (GHz) ranging from 4.0 to 9.5 GHZ.

In performing wireless communications, WWAN-capable devices may use frequency bands n79 (e.g., 4400-5000 mega Hertz (MHz)), n104 (e.g., 6425-7125 MHz), and portions of frequency range three (FR3) (e.g., 7125-8400 MHz); WLAN-capable devices may use frequency bands WiFi 5 (e.g., 5150-5850 MHz), and WiFi 6E (e.g., 5925-7125 MHz); and UWB-capable devices may use frequency bands UWB high rate phy (HRP) CH. 5 (e.g., 6240-6739 MHz), UWB HRP CH. 9 (e.g., 7737-8236 MHz), and UWB low rate phy (LRP) (keyless entry) channels (e.g., 6240-7737.6 MHz).

Note that many of these frequency bands overlap and others are very close to each other. For example, n104 frequency band overlaps with WiFi 6E, UWB LRP, and UWB HRP CH. 5 frequency bands; FR3 related frequency bands overlaps with UWB HRP CH. 9 frequency band; and n79 frequency band is very close (e.g., less than five (5) percent (%) frequency difference separating each other) to WiFi 5 frequency band, although not overlapping.

Such overlapping and close communication bands present coexistence issues for devices capable of simultaneously communicating via two or more of such protocols. For example, the transmit signal in accordance with one such protocol (e.g., n104) may couple or leak into the receiver operating in accordance with another protocol (e.g., WiFi 6E). As both are using overlapping frequency bands, the leaked signal may cause a desensitization of or even damage to the receiver; thereby, preventing simultaneous use of such protocol communications. Thus, in the past, when such wireless devices are communicating (e.g., receiving) in accordance with one such protocol, the communication hardware (e.g., transmitter) associated with the other protocol is disabled to prevent the coexistence issue.

Figure 2A:
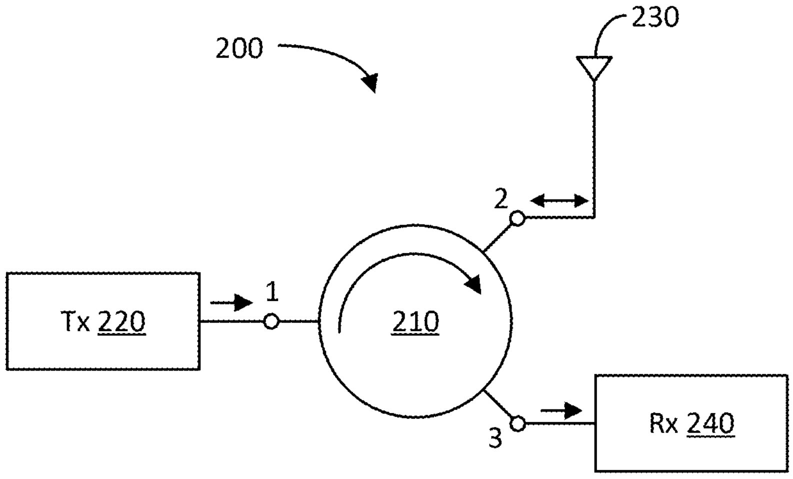
FIG. 2A illustrates a block diagram of an example transmitter-receiver antenna interface in accordance with another aspect of the disclosure.

FIG. 2A illustrates a block diagram of an example transmitter-receiver antenna interface 200 (e.g., also known as a duplexer) in accordance with another aspect of the disclosure. Some wireless communication devices use a transmitter-receiver antenna interface 200 to isolate a receiver (RX) from a transmitter (TX) signal. For example, the antenna interface 200 includes a circulator 210, a transmitter 220 coupled to a first port "1" of the circulator 210, an antenna 230 coupled to a second port "2" of the circulator 210, and a receiver 240 coupled to a third port "3" of the circulator 210.

The circulator 210 is configured to route a signal directionally from one port to an adjacent port in a clockwise manner as shown. Accordingly, in operation, the transmit signal generated by the transmitter 220 is routed from the circulator port 1 to the antenna 230 at circulator port 2. The receive signal electromagnetically picked up by the antenna 230 is routed from the circulator port 2 to the receiver (RX) at circulator port 3. The circulator 210 effectuates transmitter-receiver isolation because the ports 1 and 3 are unidirectional (as indicated by the single-arrow line), where port 2 is bidirectional (as indicated by the double-arrow line). However, as discussed further herein, the transmitter-receiver antenna interface 200 may not be suitable for simultaneous operations of two independent asynchronous transceivers coupled to ports 1 and 3, respectively.

Figure 2B:
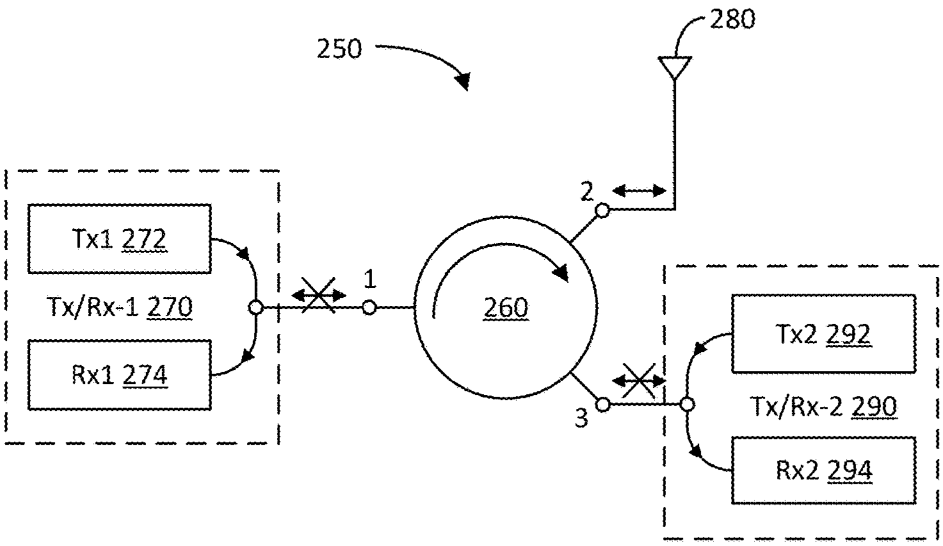
FIG. 2B illustrates a block diagram of an example unworkable dual-transceiver antenna interface in accordance with another aspect of the disclosure.

FIG. 2B illustrates a block diagram of an example dual-transceiver antenna interface 250 in accordance with another aspect of the disclosure. In this example, the antenna interface 250 includes a circulator 260, a first transceiver (Tx/Rx-1) 270 coupled to a first port "1" of the circulator 260, an antenna 280 coupled to a second port "2" of the circulator 260, and a second transceiver (Tx/Rx-2) 290 coupled to a third port "3" of the circulator 260.

The first transceiver Tx/Rx-1 270 includes a first transmitter (Tx1) 272 including an output coupled to port 1 of the circulator 260, and a first receiver (Rx1) 274 including an input coupled to port 1 of the circulator 260. Similarly, the second transceiver Tx/Rx-2 290 includes a second transmitter (Tx2) 292 including an output coupled to port 3 of the circulator 260, and a second receiver (Rx2) 294 including an input coupled to port 3 of the circulator 260.

When the first transmitter Tx1 272 of the first transceiver Tx/Rx-1 270 is transmitting and the second receiver Rx2 294 of the second transceiver Tx/Rx-2 290 is simultaneously receiving, the dual-transceiver antenna interface 250 operates similarly to the transmitter-receiver antenna interface 200 by routing the transmit signal to the antenna 280, routing the received signal to the second receiver Rx2 294, while isolating the second receiver Rx2 294 from the transmit signal of the first transmitter Tx1 272.

However, when the second transmitter Tx2 292 of the second transceiver Tx/Rx-2 290 is transmitting and the first receiver Rx1 274 of the first transceiver Tx/Rx-1 270 is simultaneously receiving, the dual-transceiver antenna interface 250 does neither operate to isolate the first receiver Rx1 274 from the transmit signal of the second transmitter Tx2 292, to route the transmit signal from the second transmitter Tx2 292 to the antenna 280, nor route the received signal from the antenna 280 to the first receiver Rx1 274. Instead, the circulator 260, due to its directional (e.g., clockwise) signal routing properties, would route the transmit signal of the second transmitter Tx2 292 to the first receiver Rx1 274 and route the received signal intended for the first receiver Rx1 274 from the antenna 280 to the second transmitter Tx2 292. Thus, in this case, ports 1 and 3 of the circulator 260 may not operate as bidirectional ports (as indicated by the crossed-out double arrow lines). Therefore, another solution for simultaneous dual transceiver operations is needed.

Figure 3:
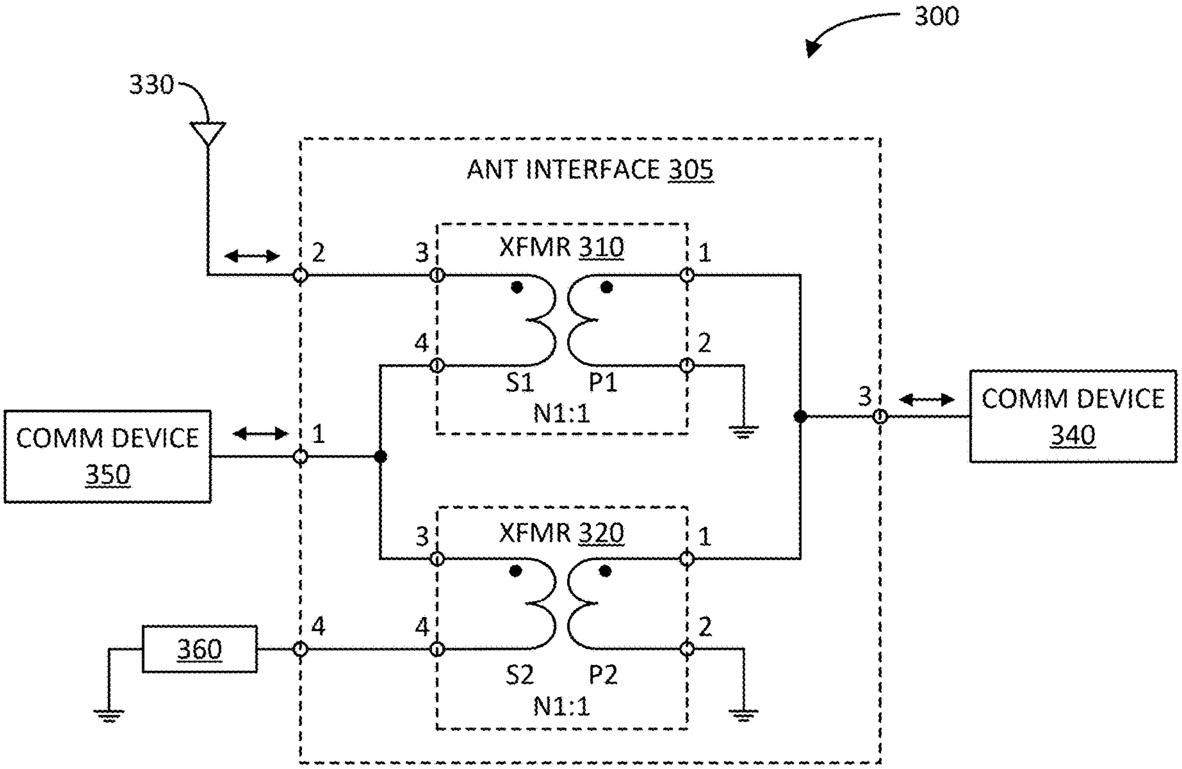
FIG. 3 illustrates a block diagram of an example wireless communication device including a multi-communication device antenna interface in accordance with another aspect of the disclosure.

FIG. 3 illustrates a block diagram of an example wireless communication device 300 in accordance with another aspect of the disclosure. The wireless communication device 300 includes a multi-communication device antenna interface 305, an antenna 330, a first communication device 340, a second communication device 350, and a ballast load 360.

The antenna interface 305 includes a first transformer (XFMR) 310 including a primary winding P1 and a secondary winding S1. The antenna interface 305 further includes a second transformer (XFMR) 320 including a primary winding P2 and a secondary winding S2.

More specifically, the antenna interface 305 includes a first port "1" coupled (or configured to couple) to the second communication device 350, a second port "2" coupled (or configured to couple) to the antenna 330, a third port "3" coupled (or configured to couple) to the first communication device 340, and a fourth port "4" coupled (or configured to couple) to a ballast load 360.

The primary winding P1 of the first transformer 310 includes a first end "1" coupled to the first communication device 340 via port 3 of the antenna interface 305. The primary winding P1 of the first transformer 310 includes a second end "2" coupled to a reference potential electrode (e.g., ground). The secondary winding S1 of the first transformer 310 includes a first end "3" coupled to the antenna 330 via port 2 of the antenna interface 305. And, the secondary winding S1 of the first transformer 310 includes a second end "4" coupled to the second communication device 350 via port 1 of the antenna interface 305.

The primary winding P2 of the second transformer 320 includes a first end "1" coupled to the first communication device 340 via port 3 of the antenna interface 305. The primary winding P2 of the second transformer 320 includes a second end "2" coupled to the reference potential electrode. The secondary winding S2 of the second transformer 320 includes a first end "3" coupled to the second communication device 350 via port 1 of the antenna interface 305. And, the secondary winding S2 of the second transformer 320 includes a second end "4" coupled to the ballast load 360 via port 4 of the antenna interface 305. The ballast load 360 may be coupled between port 4 of the antenna interface 305 and the reference potential electrode.

The first, second, and third ports 1-3 of the antenna interface 305 may be bidirectional (as indicated by the dual arrow lines positioned by their respective ports) with respect to routing transmit/receive signals between the antenna 330 and the first and second communication devices 340 and 350, respectively. Accordingly, the first communication device 340 may be a transceiver, a transmitter, or a receiver. Similarly, the second communication device 350 may also be a transceiver, a transmitter, or receiver. Additionally, the first and second communication devices 340 and 350 may simultaneously process (e.g., transmit and/or receive) signals pertaining to frequency overlapping communication bands or communication bands that are relatively close to each other in frequency (e.g., within 5% frequency difference separating each other), respectively. Further, the first and second communication devices 340 and 350 may process signals pertaining to different or same protocols (e.g., WWAN-WLAN, WWAN-UWB, WLAN-UWB, WWAN-Bluetooth, WLAN-Bluetooth, WWAN-band1-WWAN-band2, WLAN-band1-WLAN-band2, any other combinational pair of the aforementioned, or other combination).

Ideally, the antenna interface 305 may achieve a three (3) decibel (dB) insertion loss between ports 1-2

(e.g., $S21 = S12 = 3$ dB)

and 2-3

$$(\text{e.g., } S32 = S23 = 3 \text{ dB}),$$

with an infinite isolation between ports 1-3

$$(\text{e.g., } S31 = S13 = \infty \text{ dB}).$$

The antenna interface 305 may achieve the aforementioned insertion losses and isolation if the impedances $Z_{ANT}$, $Z_{CD1}$, $Z_{CD2}$, and $Z_{BAL}$ of the antenna 330, the first and second communication devices 340 and 350, and the ballast load 360 at ports 2, 1, 3, and 4 of the antenna interface 305, respectively, are set in accordance with the following equations:

$$Z_{CD1} = Z^{*}_{ANT} \quad \text{EQ. 1}$$

$$Z_{CD2} = (1/2) \cdot Z^{*}_{ANT} \quad \text{EQ. 2}$$

$$Z_{BAL} = Z_{ANT} \quad \text{EQ. 3}$$

$$N_1 = sqrt(|Z_{CD2}|/|Z_{CD1}|) \quad \text{EQ. 4}$$

Where N1 is the turns ratio between the secondary and primary windings of the first and second transformers 310 and 320, and the symbol * denotes the conjugate impedance. The following describes various example implementations of wireless communication devices based on wireless communication device 300.

Figure 4:
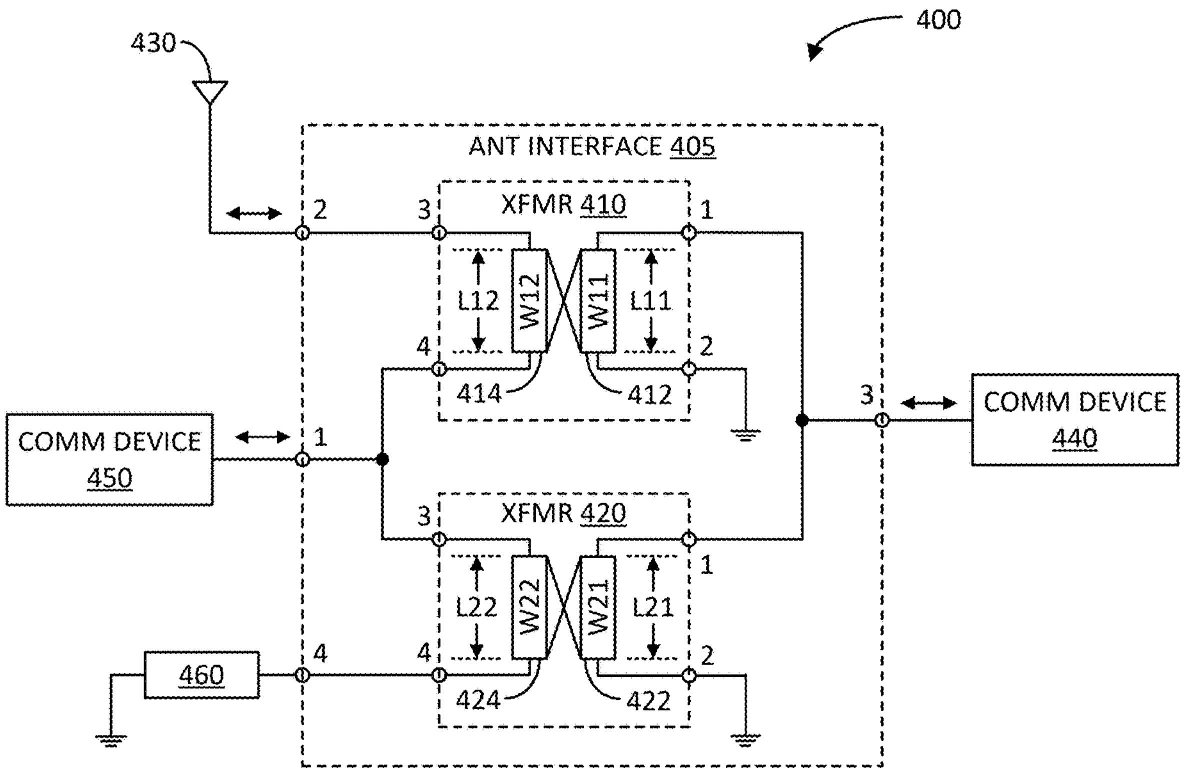
FIG. 4 illustrates a block diagram of another example wireless communication device including a multi-communication device antenna interface in accordance with another aspect of the disclosure.

FIG. 4 illustrates a block diagram of another example wireless communication device 400 in accordance with another aspect of the disclosure. The wireless communication device 400 includes a multi-communication device antenna interface 405, an antenna 430, a first communication device 440, a second communication device 450, and a ballast load 460. The antenna interface 405 includes a first coupled line transformer (XFMR) 410 (e.g., also referred to as a transmission line transformer) including a first (e.g., planar) transmission line 412 parallel coupled to a second (e.g., planar) transmission line 414. The antenna interface 405 further includes a second coupled line transformer (XFMR) 420 including a first (e.g., planar) transmission line 422 parallel coupled to a second (e.g., planar) transmission line 424.

The antenna interface 405 includes a first port "1" coupled (or configured to couple) to the second communication device 450, a second port "2" coupled (or configured to couple) to the antenna 430, a third port "3" coupled (or configured to couple) to the first communication device 440, and a fourth port "4" coupled (or configured to couple) to a ballast load 460.

The first transmission line 412 of the first transformer 410 includes a first end "1" coupled to the first communication device 440 via port 3 of the antenna interface 405. The first transmission line 412 of the first transformer 410 includes a second end "2" coupled to a reference potential electrode (e.g., ground). The second transmission line 414 of the first transformer 410 includes a first end "3" coupled to the antenna 430 via port 2 of the antenna interface 405. The second transmission line 414 of the first transformer 410 includes a second end "4" coupled to the second communication device 450 via port 1 of the antenna interface 405.

The first transmission line 422 of the second transformer 420 includes a first end "1" coupled to the first communication device 440 via port 3 of the antenna interface 405. The first transmission line 422 of the second transformer 420 includes a second end "2" coupled to the reference potential electrode. The second transmission line 424 of the second transformer 420 includes a first end "3" coupled to the second communication device 450 via port 1 of the antenna interface 405. The second transmission line 424 of the second transformer 420 includes a second end "4" coupled to the ballast load 460 via port 4 of the antenna interface 405. The ballast load 460 may be coupled between port 4 of the antenna interface 405 and the reference potential electrode.

The first, second, and third ports 1-3 of the antenna interface 405 may be bidirectional (as indicated by the dual arrow lines positioned by their respective ports) with respect to routing transmit/receive signals between the antenna 430 and the first and second communication devices 440 and 450, respectively. Accordingly, the first communication device 440 may be a transceiver, a transmitter, or a receiver. Similarly, the second communication device 450 may also be a transceiver, a transmitter, or receiver. Additionally, the first and second communication devices 440 and 450 may simultaneously process (e.g., transmit and/or receive) signals pertaining to frequency overlapping communication bands or communication bands that are relatively close to each other in frequency (e.g., within 5% frequency difference separating each other), respectively. Further, the first and second communication devices 440 and 450 may process signals pertaining to different or same protocols (e.g., WWAN-WLAN, WWAN-UWB, or WLAN-UWB, WWAN-Bluetooth, WLAN-Bluetooth, WWAN-band1-WWAN-band2, WLAN-band1-WLAN-band2, any other combinational pair of the aforementioned, or other combination).

Ideally, the antenna interface 405 may achieve a three (3) decibel (dB) insertion loss between ports 1-2

$$(\text{e.g., } S21 = S12 = 3 \text{ dB})$$

and 2-3

$$(\text{e.g., } S32 = S23 = 3 \text{ dB}),$$

with an infinite isolation between ports 1-3

$$(\text{e.g., } S31 = S13 = \infty \text{ dB})$$

if the impedances $Z_{ANT}$, $Z_{CD1}$, $Z_{CD2}$, and $Z_{BAL}$ of the antenna 430, the first and second communication devices 440 and 450, and the ballast load 460 at ports 2, 3, 1, and 4 of the antenna interface 405 are set in accordance with EQs. 1-4, respectively. However, due to parasitics, the ideal performance in terms of insertion losses and isolation may not be able to be achieved.

Accordingly, it has been found out that configurating the first and second transformers 410 and 420 asymmetrically with respect to the widths W11/W12 and W21/W22 and lengths L11/L12 and L21/L22 of their respective first and second transmission lines 412/414 and 422/424, improved performance with respect to the respective insertion losses between ports 1-2 and 2-3, isolation between ports 1-3, and bandwidth may be achieved.

That is, the widths W11 and W12 of the first and second transmission lines 412 and 414 of the first transformer 410 may be different from the widths W21 and W22 of the first and second transmission lines 422 and 424 of the second transformer 420

$$(\text{e.g., } W11 \approx W12 \neq W21 \approx W22).$$

Further, the widths W11 and W12 of the first and second transmission lines 412 and 414 of the first transformer 410 may be slightly different to each other to account for alignment tolerances as the transmission lines 412 and 414 may be situated on different metal layers and substantially aligned vertically. Similarly, the widths W21 and W22 of the first and second transmission lines 422 and 424 of the second transformer 420 may be slightly different to each other to account for alignment tolerances as the transmission lines 422 and 424 may be situated on different metal layers and substantially aligned vertically. Also, the lengths L11 and L12 of the first and second transmission lines 412 and 414 of the first transformer 410 may be different from the lengths L21 and L22 of the first and second transmission lines 422 and 424 of the second transformer 420

$$(\text{e.g., } L11 \approx L12 \neq L21 \approx L22).$$

For example, in the case where the first communication device 440 process signals pursuant to communication band n104 (e.g., 6425-7125 MHz) and the second communication device 450 process signals pursuant to communication band WiFi 6E (e.g., 5925-7125 MHz), the widths W11 and W12 of the first and second transmission lines 412 and 414 of the first transformer 410 may each be substantially 124 micrometers (μm), and the widths W21 and W22 of the first and second transmission lines 422 and 424 of the second transformer 420 may each be substantially 57 μm. That is, the widths W11 and W12 of the first and second transmission lines 412 and 414 of the first transformer 410 may be at least 25% greater than the widths W21 and W22 of the first and second transmission lines 422 and 424 of the second transformer 420.

Further, the lengths L11 and L12 of the first and second transmission lines 412 and 414 of the first transformer 410 may each be substantially 958 μm and the lengths L21 and L22 of the first and second transmission lines 422 and 424 of the second transformer 420 may each be substantially 1070 μm. These width and lengths dimensions may be applicable if the antenna interface 405 includes respective capacitors across the second transmission lines 414 and 424 of the first and second transformers 410 and 420, as discussed herein with reference to a following example implementation.

Figure 5:
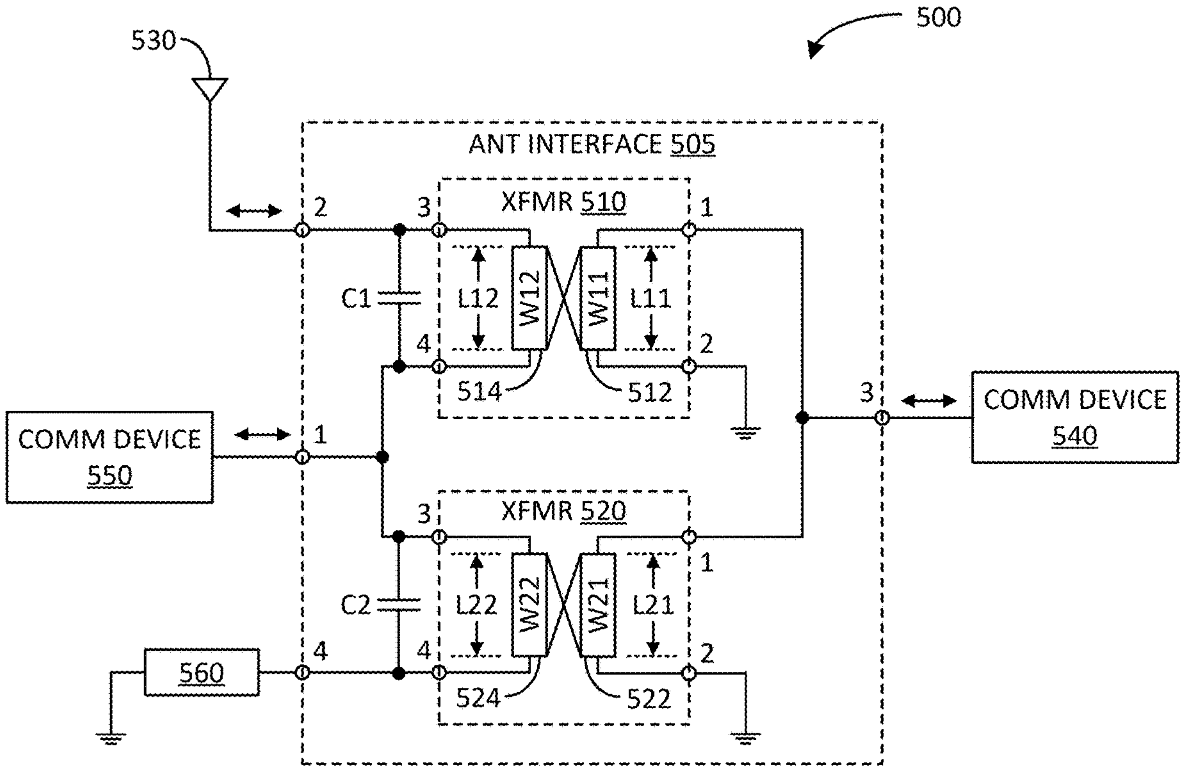
FIG. 5 illustrates a block diagram of another example wireless communication device including a multi-communication device antenna interface in accordance with another aspect of the disclosure.

FIG. 5 illustrates a block diagram of another example wireless communication device 500 in accordance with another aspect of the disclosure. The wireless communication device 500 may be a variation of wireless communication device 400 previously discussed, and includes many of the same/similar elements in the same arrangement as indicated by the same reference numbers with the exception that most significant digit is a "5" in wireless communication device 500 instead of a "4" as in wireless communication device 400.

As previously alluded to, the antenna interface 505 includes a first capacitor C1 coupled across the first end "3" and the second end "4" of the second transmission line 514 of the first transformer 510. Similarly, the antenna interface 505 includes a second capacitor C2 coupled across the first end "3" and the second end "4" of the second transmission line 524 of the second transformer 520. The capacitors C1 and C2 allow the lengths L11/L12 and L21/L22 of the first and second transmission lines 512/514 and 522/524 of the first and second transformers 510 and 520 to be made shorter than a quarterwave (λ/4) length at a frequency-of-interest (e.g., a centralized frequency between the operating communication bands of the first and second communication devices 540 and 550). This allows the antenna interface 505 to be implemented with a smaller circuit footprint.

Figure 6A:
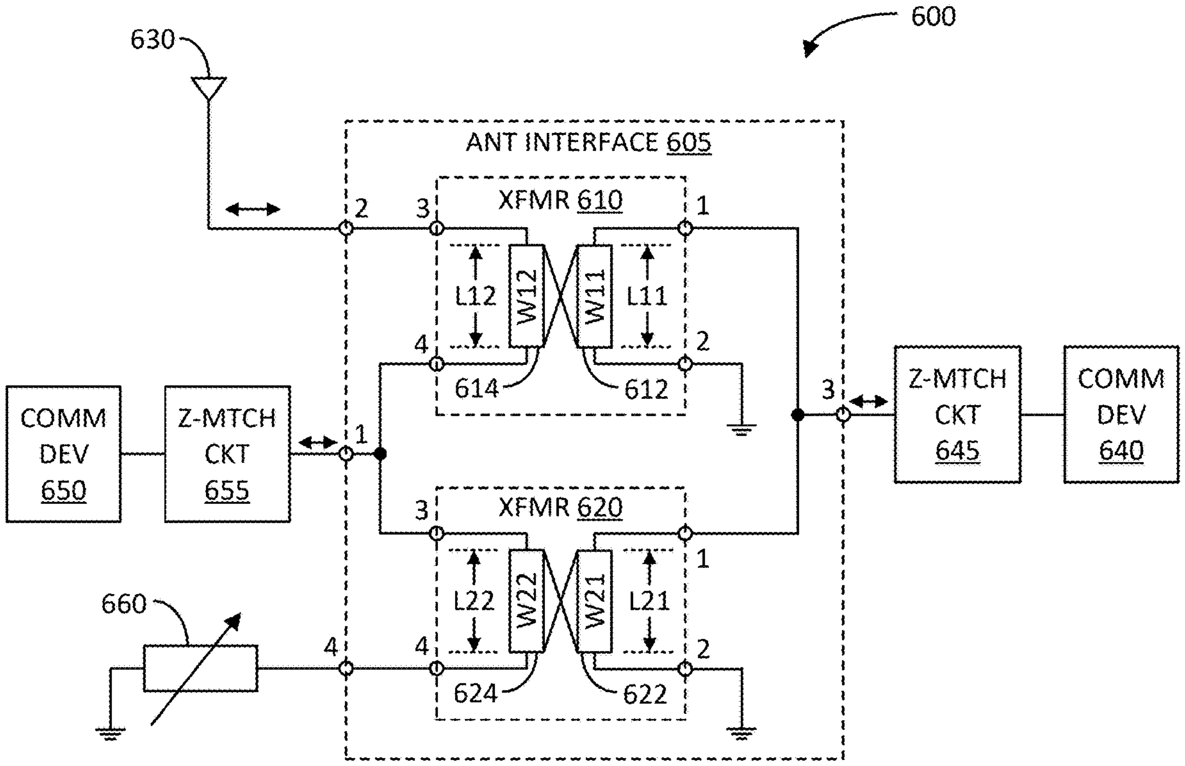
FIG. 6A illustrates a block diagram of another example wireless communication device including a multi-communication device antenna interface in accordance with another aspect of the disclosure.

FIG. 6A illustrates a block diagram of another example wireless communication device 600 in accordance with another aspect of the disclosure. The wireless communication device 600 may be another variation of wireless communication device 400 previously discussed, and includes many of the same/similar elements in the same arrangement as indicated by the same reference numbers with the exception that most significant digit is a "6" in wireless communication device 600 instead of a "4" as in wireless communication device 400.

As previously discussed, to achieve good performance with respect to insertion losses between ports 1-2 and 2-3 of the antenna interface 605, and isolation between ports 1-3 of the antenna interface 605, the impedances $Z_{ANT}$, $Z_{CD1}$, $Z_{CD2}$, and $Z_{BAL}$ of the antenna 630, the first and second communication devices 640 and 650, and the ballast load 660 at ports 2, 1, 3, and 4 of the antenna interface 605 may be set in accordance with EQs. 1-4, respectively. However, due to parasitics and design criteria with respect to the first and second communication devices 640 and 650, the impedances of the first and second communication devices 640 and 650 at ports 3 and 1 of the antenna interface 605 may not substantially comply with EQs. 1-2 across the cumulative bandwidth of the first and second operating communication bands of the first and second communication devices 640 and 650, respectively.

Accordingly, the wireless communication device 600 further includes a first impedance matching (Z-MTCH) circuit 645 coupled between the first communication device 640 and port 3 of the antenna interface 605, and a second impedance matching (Z-MTCH) circuit 655 coupled between the second communication device 650 and port 1 of the antenna interface 605. The first and second impedance matching circuits 645 and 655 transform the impedances of the first and second communication devices 640 and 650 so that the impedances presented to ports 3 and 1 of the antenna interface 605 better comply with the EQs. 1-2 to improve performance with respect to insertion losses between ports 1-2 and 2-3, and isolation between ports 1-3 of the antenna interface 605. Additionally, the ballast load 660 may have a tunable impedance in order to better comply with Eq. 3 and/or improve the performance of the antenna interface 605 with respect to insertion losses and isolation as previously discussed.

Figure 6B:
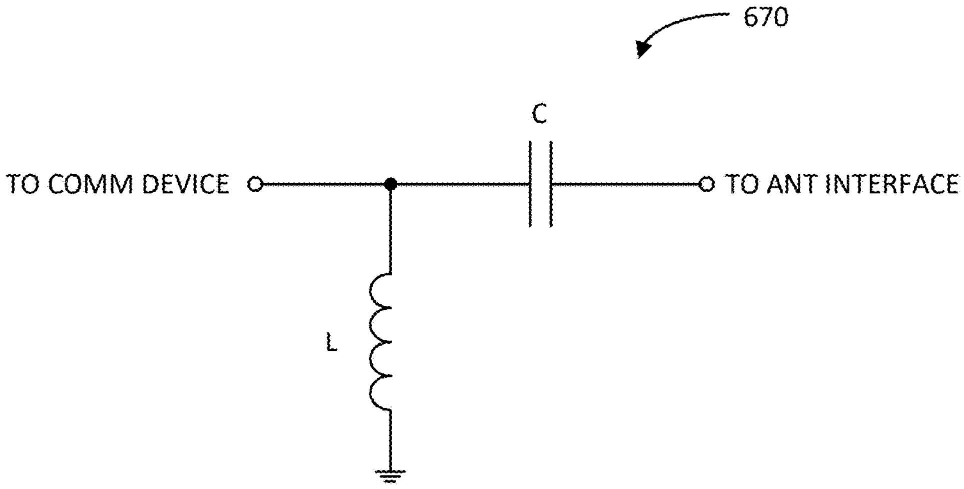
FIG. 6B illustrates a schematic diagram of an example impedance matching circuit that may be employed in the example multi-communication device antenna interfaces of FIGS. 6A and 8A in accordance with another aspect of the disclosure.

FIG. 6B illustrates a schematic diagram of an example impedance matching circuit 670 in accordance with another aspect of the disclosure. The impedance matching circuit 670 may be an example of either one or both of impedance matching circuits 645 and 655 of wireless communication device 600. In particular, the impedance matching circuit 670 includes a shunt inductor L coupled between the corresponding communication device and the reference potential electrode (e.g., ground). Additionally, the impedance matching circuit 670 includes a series capacitor C coupled between the corresponding communication device and the corresponding port (e.g., port 1 or 3) of the antenna interface 605. The shunt inductor L and/or series capacitor C may be made variable for tuning the impedance matching circuit 670 for improved performance with respect to insertion losses and isolation as previously discussed. Other LC combinations in various pi and tee networks or other impedance matching networks may be possible.

Figure 7A:
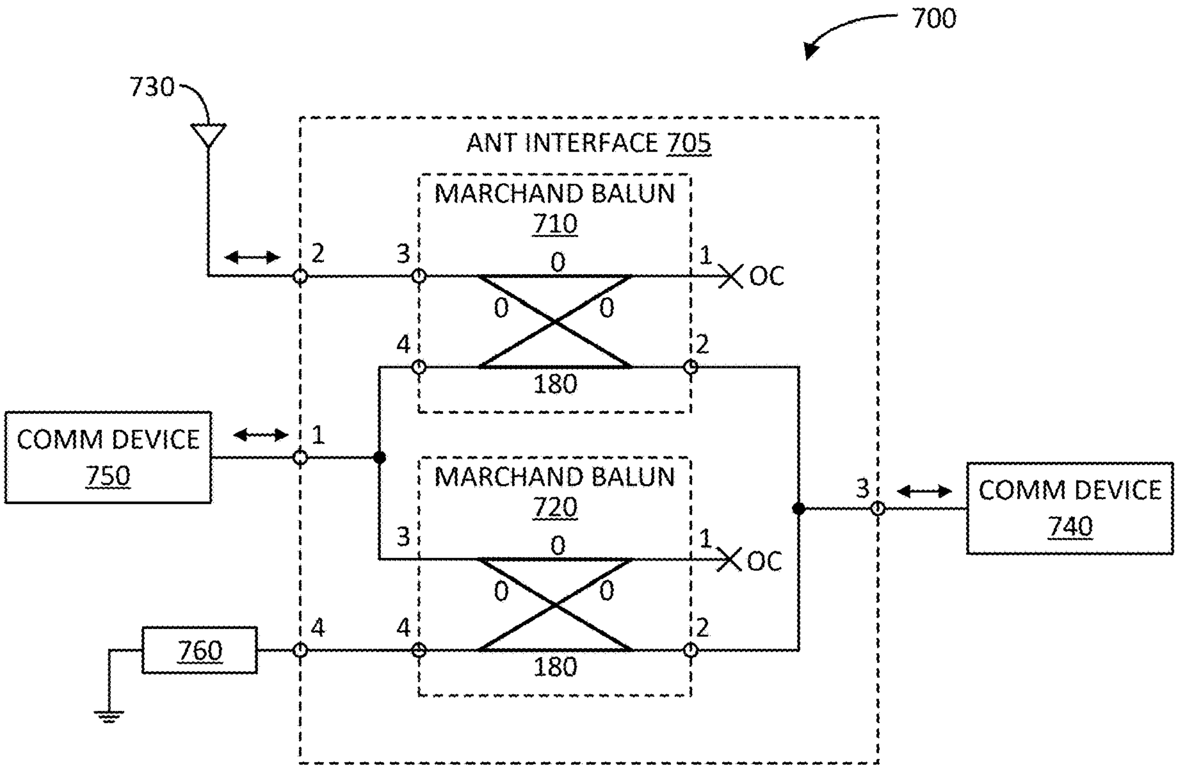
FIG. 7A illustrates a block diagram of another example wireless communication device including a multi-communication device antenna interface in accordance with another aspect of the disclosure.

FIG. 7A illustrates a block diagram of an example wireless communication device 700 in accordance with another aspect of the disclosure. The wireless communication device 700 includes a multi-communication device antenna interface 705, an antenna 730, a first communication device 740, a second communication device 750, and a ballast load 760.

The antenna interface 705 includes a first Marchand balun 710 and a second Marchand balun 720. The antenna interface 705 includes a first port "1" coupled (or configured to couple) to the second communication device 750, a second port "2" coupled (or configured to couple) to the antenna 730, a third port "3" coupled (or configured to couple) to the first communication device 740, and a fourth port "4" coupled (or configured to couple) to a ballast load 760.

The first Marchand balun 710 includes a first port "1" that terminates at an open circuit (OC), a second port "2" coupled to the first communication device 740 via port 3 of the antenna interface 705, a third port "3" coupled to the antenna 730 via port 2 of the antenna interface 705, and a fourth port "4" coupled to the second communication device 750 via port 1 of the antenna interface 705. Similarly, the second Marchand balun 720 includes a first port "1" that terminates at an open circuit (OC), a second port "2" coupled to the first communication device 740 via port 3 of the antenna interface 705, a third port "3" coupled to the second communication device 750 via port 1 of the antenna interface 705, and a fourth port "4" coupled to the ballast load 760 via port 4 of the antenna interface 705. The ballast load 760 may be coupled between port 4 of the antenna interface 705 and the reference potential electrode. In both the first and second Marchand baluns 710 and 720, the third port 3 is the in-phase (0°) port with respect to the second port 2, and the fourth port 4 is the out-of-phase (180°) port with respect to the second port 2.

The first, second, and third ports 1-3 of the antenna interface 705 may be bidirectional (as indicated by the dual arrow lines positioned by their respective ports) with respect to routing transmit/receive signals between the antenna 730 and the first and second communication devices 740 and 750, respectively. Accordingly, the first communication device 740 may be a transceiver, a transmitter, or a receiver. Similarly, the second communication device 750 may also be a transceiver, a transmitter, or receiver. Additionally, the first and second communication devices 740 and 750 may simultaneously process (e.g., transmit and/or receive) signals pertaining to frequency overlapping communication bands or communication bands that are relatively close to each other in frequency (e.g., within 5% frequency difference separating each other), respectively. Further, the first and second communication devices 740 and 750 may process signals pertaining to different or same protocols (e.g., WWAN-WLAN, WWAN-UWB, WLAN-UWB, WWAN-Bluetooth, WLAN-Bluetooth, WWAN-band1-WWAN-band2, WLAN-band1-WLAN-band2, any other combinational pair of the aforementioned, or other combination).

The first and second Marchand baluns 710 and 720 are frequency-specific devices, and should be implemented to achieve the desired insertion losses between ports 1-2 and 2-3 of the antenna interface 705, and desired isolation between ports 1-3 for the frequency range covering the overlapping or close operating communication bands of the first and second communication devices 740 and 750.

Figure 7B:
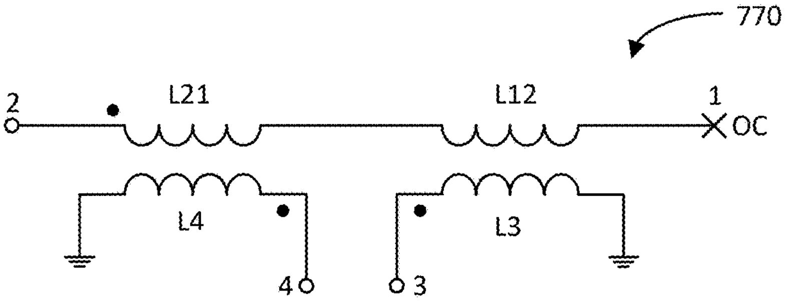
FIG. 7B illustrates a schematic diagram of an example Marchand balun that may be used in the example multi-communication device antenna interface of FIG. 7A in accordance with another aspect of the disclosure.

FIG. 7B illustrates a schematic diagram of an example Marchand balun 770 in accordance with another aspect of the disclosure. The Marchand balun 770 may be a detailed implementation of any one of the first and second Marchand baluns 710 and 720. In particular, the Marchand balun 770 includes first and second inductors L12 and L21 coupled in series between ports 1 and 2 of the Marchand balun 770. As previously discussed, port 1 of the Marchand balun 770 terminates at an open circuit (OC). The Marchand balun 770 includes a third inductor L3 coupled between port 3 of the Marchand balun 770 and a reference potential electrode (e.g., ground). The Marchand balun 770 further includes a fourth inductor LA coupled between port 4 of the Marchand balun 770 and the reference potential electrode.

The inductors L12 and L3 are electromagnetically coupled together, and the inductors L21 and L4 are electromagnetically coupled together, such that port 3 is the in-phase (0°) port with respect to port 2 of the Marchand balun 770 as indicated by the polarity dots being on the same (e.g., left) side of the inductors L21 and L3, and port 4 is the out-of-phase (180°) port with respect to port 2 of the Marchand balun 770 as indicated by the polarity dots being on opposite sides of the inductors L21 and L4, respectively. As previously mentioned, the Marchand balun 770 is frequency specific, and the inductances of the inductors L12, L21, L3, and L4 may be set in accordance with the specific frequency of interest (e.g., a centralized frequency between the operating communication bands of the first and second communication devices 740 and 750).

Figure 7C:
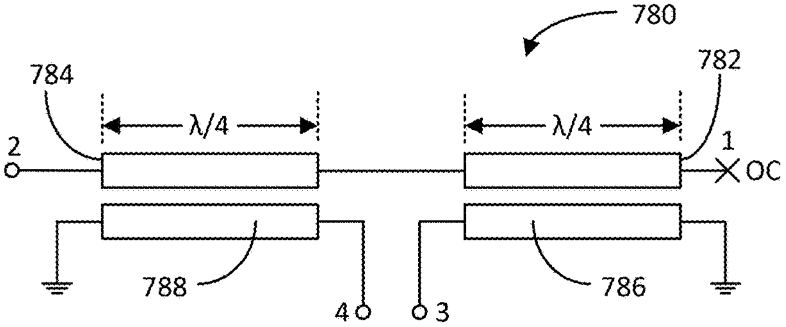
FIG. 7C illustrates a layout diagram of an example Marchand balun that may be used in the example multi-communication device antenna interface of FIG. 7A in accordance with another aspect of the disclosure.

FIG. 7C illustrates a physical layout diagram of an example Marchand balun 780 in accordance with another aspect of the disclosure. The Marchand balun 780 may be a detailed implementation of any of the first and second Marchand baluns 710 and 720. In particular, the Marchand balun 780 includes first and second (e.g., planar) transmission lines 782 and 784 coupled in series between ports 1 and 2 of the Marchand balun 780. As previously discussed, port 1 of the Marchand balun 780 terminates at an open circuit (OC). The Marchand balun 780 includes a third (e.g., planar) transmission line 786 coupled between port 3 of the Marchand balun 780 and a reference potential electrode (e.g., ground). The Marchand balun 780 further includes a fourth (e.g., planar) transmission line 788 coupled between port 4 of the Marchand balun 780 and the reference potential electrode.

The first and third transmission lines 782 and 786 are parallel coupled to each other, and the second and fourth transmission lines 784 and 788 are parallel coupled to each other, such that port 3 is the in-phase (0°) port with respect to port 2 of the Marchand balun 780 and port 4 is the out-of-phase (180°) port with respect to port 2 of the Marchand balun 780. As previously mentioned, the Marchand balun 780 is frequency specific, and the lengths of the parallel coupled transmission lines 782/786 and 784/788 may each be set to substantially a quarterwave (24) at a specific frequency of interest (e.g., a centralized frequency within an overlapping frequency range of the operating communication bands of the first and second communication devices 740 and 750, or a centralized frequency between non-overlapping operating communication bands of the first and second communication devices 740 and 750).

Figure 8A:
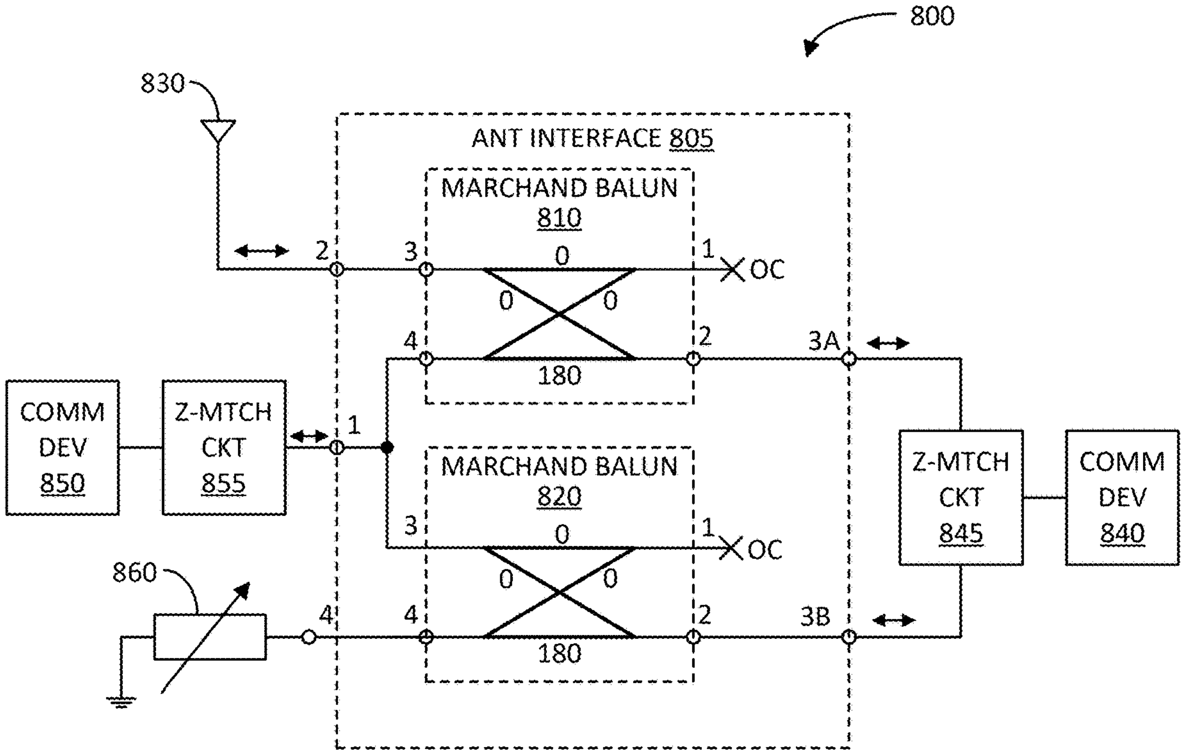
FIG. 8A illustrates a block diagram of another example wireless communication device including a multi-communication device antenna interface in accordance with another aspect of the disclosure.

FIG. 8A illustrates a block diagram of another example wireless communication device 800 in accordance with another aspect of the disclosure. The wireless communication device 800 may be another variation of wireless communication device 700 previously discussed, and includes many of the same/similar elements in the same arrangement as indicated by the same reference numbers with the exception that most significant digit is an "8" in wireless communication device 800 instead of a "7" as in wireless communication device 700.

As previously discussed, to achieve good performance with respect to insertion losses between ports 1-2 and 2-3A/3B of the antenna interface 805, and isolation between ports 1 and 3A/3B of the antenna interface 805, impedance matching between the first and second communication devices 840 and 850 and ports 1 and 3A/3B of the antenna interface 805 may be needed. In this regard, the wireless communication device 800 further includes a first impedance matching (Z-MTCH) circuit 845 coupled between the first communication device 840 and ports 3A/3B of the antenna interface 805, and a second impedance matching (Z-MTCH) circuit 855 coupled between the second communication device 850 and port 1 of the antenna interface 805. Port 3A is coupled to the second port 2 of the first Marchand balun 810, and port 3B is coupled to the second port 2 of the second Marchand balun 820. The first and second impedance matching circuits 845 and 855 transform the impedances of the first and second communication devices 840 and 850 so that the impedances presented to ports 3A/3B and 1 of the antenna interface 805 achieve improved performance with respect to insertion losses between the antenna 830 and the first and second communication devices 840 and 850, respectively.

Figure 8B:
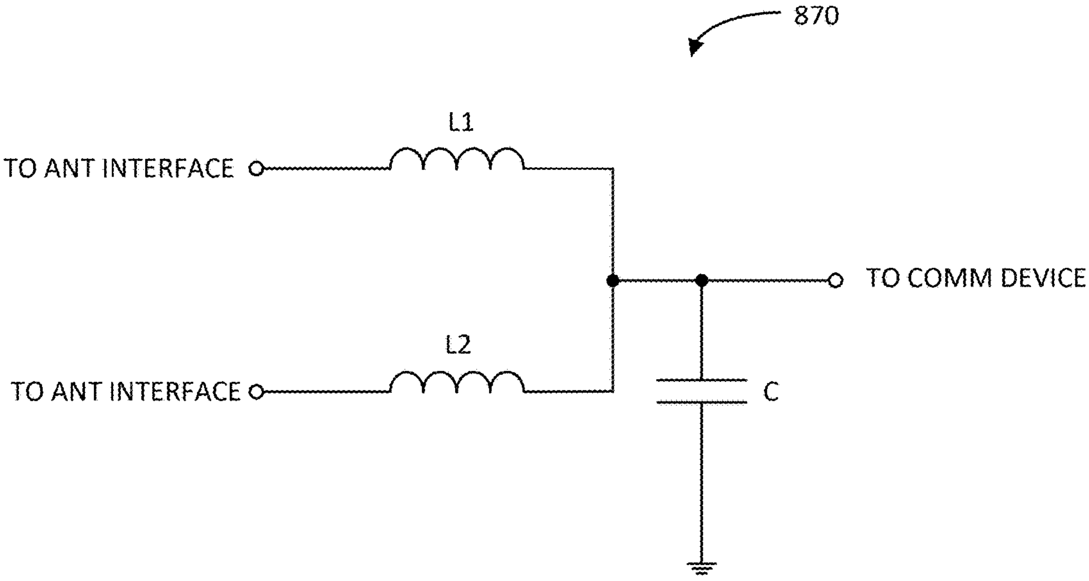
FIG. 8B illustrates a schematic diagram of an example impedance matching circuit that may be employed in the example multi-communication device antenna interface of FIG. 8A in accordance with another aspect of the disclosure.

FIG. 8B illustrates a schematic diagram of an example impedance matching circuit 870 in accordance with another aspect of the disclosure. The impedance matching circuit 870 may be an example of the first impedance matching circuit 845 of wireless communication device 800. The impedance matching circuit 855 may be implemented in accordance with the shunt inductor-series capacitor impedance matching circuit 670 previously discussed.

In particular, the impedance matching circuit 870 includes a shunt capacitor C coupled between the communication device 840 and the reference potential electrode (e.g., ground). Additionally, the impedance matching circuit 870 includes a first series inductor L1 coupled between the communication device 840 and port 3A of the antenna interface 805. Similarly, the impedance matching circuit 870 includes a second series inductor L2 coupled between the communication device 840 and port 3B of the antenna interface 805. The shunt capacitor C and/or the series inductors L1 and L2 may be made variable for tuning the impedance matching circuit 870 for improved performance with respect to insertion losses and isolation as previously discussed.

Figure 9:
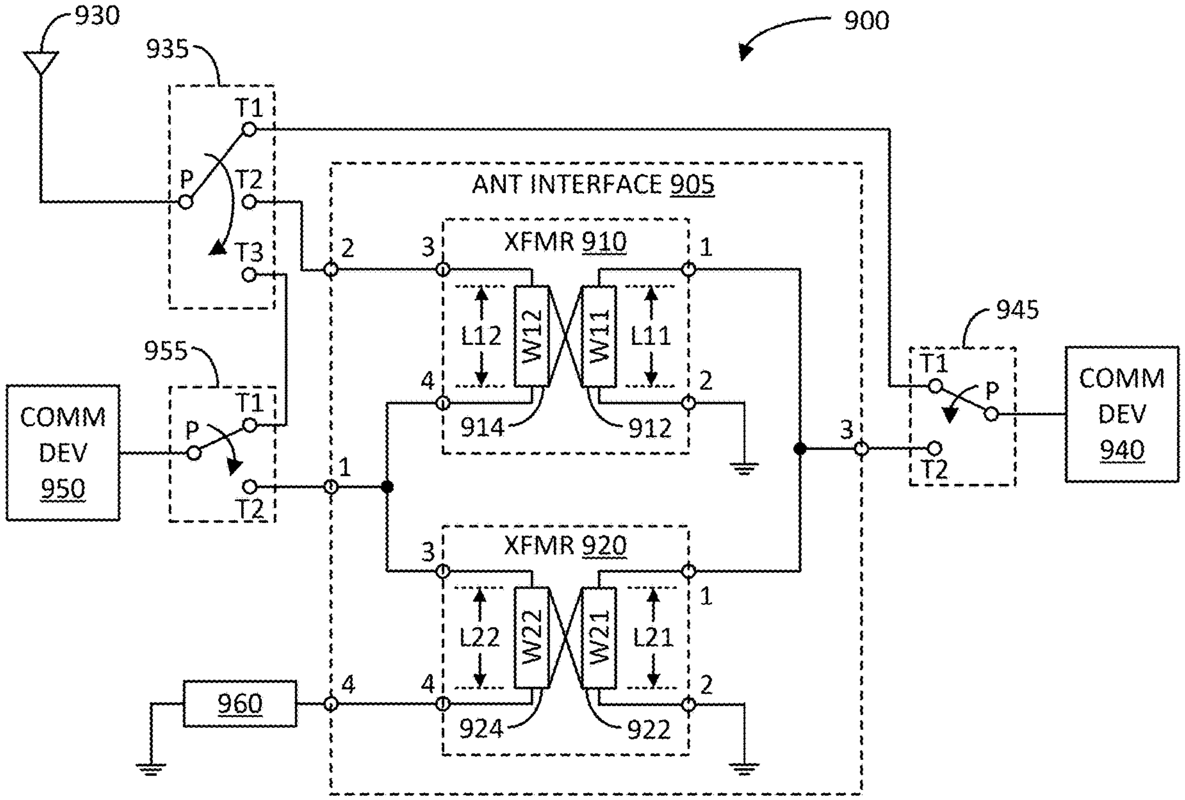
FIG. 9 illustrates a block diagram of another example wireless communication device including a multi-communication device antenna interface in accordance with another aspect of the disclosure.

FIG. 9 illustrates a block diagram of another example wireless communication device 900 in accordance with another aspect of the disclosure. As discussed in more detail herein, the wireless communication device 900 includes a set of one or more switching devices configured to: (1) couple both active first and second communication devices to an antenna via an antenna interface while the antenna interface substantially isolates the devices from each other as previously discussed with reference to wireless communication devices 300 to 600; or (2) couple an active one of first or second communication device to the antenna while bypassing an antenna interface, and isolating an inactive one of the first or second communication device from the antenna. In this example, the wireless communication device 900 is based on wireless communication device 400 previously discussed. However, it shall be understood that the wireless communication device 900 may be based on any one of wireless communication devices 300, 500, and 600. For example, in the case of wireless communication device 600, a pair of the switching devices (e.g., switching devices 945 and 955 as discussed further herein) may be coupled to ports 3 and 1 of the antenna interface via impedance matching circuits 645 and 655, respectively.

In this regard, the wireless communication device 900 includes an antenna interface 905 implemented per antenna interface 405 as indicated by the same antenna interface port numbering and transformer port number of first and second transformers 910 and 920, as previously discussed in detail. The wireless communication device 900 further includes a first switching device 935, a second switching device 945, and a third switching device 955. The switching device 935 may be configured as a single-pole-triple-throw (SPTT) switching device, and each of the second and third switching devices 945 and 955 may be implemented as a single-pole-double-throw (SPDT) switching device.

The SPTT switching device 935 includes a pole (P) coupled to an antenna 930, a first throw (T1) coupled to a first throw (T1) of the SPDT switching device 945, a second throw (T2) coupled to port 2 of the antenna interface 905, and a third throw (T3) coupled to a first throw (T1) of the SPDT switching device 955. The SPDT switching device 945 includes a pole (P) coupled to a first communication device 940, and a second throw (T2) coupled to port 3 of the antenna interface 905. The SPDT switching device 955 includes a pole (P) coupled to a second communication device 950, and a second throw (T2) coupled to port 1 of the antenna interface 905.

In a first mode of operation where the first communication device 940 is active and the second communication device 950 is inactive, the SPTT switching device 935 is configured to couple its pole (P) to its first throw (T1), the SPDT switching device 945 is configured to couple its pole (P) to its first throw (T1), and the SPDT switching device 955 is configured to couple its pole (P) to its second throw (T2). In this configuration, the "active" first communication device 940 is coupled to the antenna 930 while bypassing the antenna interface 905, and the "inactive" second communication device 950 is substantially isolated from the antenna 930 as it is coupled to the bypassed antenna interface 905. This configuration reduces the insertion loss between the "active" first communication device 940 and the antenna 930 compared to if the first communication device 940 where to be coupled to the antenna 930 via the antenna interface 905.

In a second mode of operation where the first communication device 940 is inactive and the second communication device 950 is active, the SPTT switching device 935 is configured to couple its pole (P) to its third throw (T3), the SPDT switching device 945 is configured to couple its pole (P) to its second throw (T2), and the SPDT switching device 955 is configured to couple its pole (P) to its first throw (T1). In this configuration, the "active" second communication device 950 is coupled to the antenna 930 while bypassing the antenna interface, while the "inactive" first communication device 940 is substantially isolated from the antenna 930 as it is coupled to the bypassed antenna interface 905. This configuration reduces the insertion loss between the "active" second communication device 950 and the antenna 930 compared to if the second communication device 950 where to be coupled to the antenna 930 via the antenna interface 905.

In a third mode of operation where both the first and second communication devices 940 and 950 are active, the SPTT switching device 935 is configured to couple its pole (P) to its second throw (T2), the SPDT switching device 945 is configured to couple its pole (P) to its second throw (T2), and the SPDT switching device 955 is configured to couple its pole (P) to its second throw (T2). In this configuration, the first and second communication devices 940 and 950 are coupled to the antenna 930 via the antenna interface 905, while the antenna interface 905 substantially isolates the first communication device 940 from the second communication device 950 as previously discussed. While the switching devices have been described in terms of poles and throws it should be appreciated that various switching circuitry may be possible that may provide the switching functionality as described herein.

Figure 10:
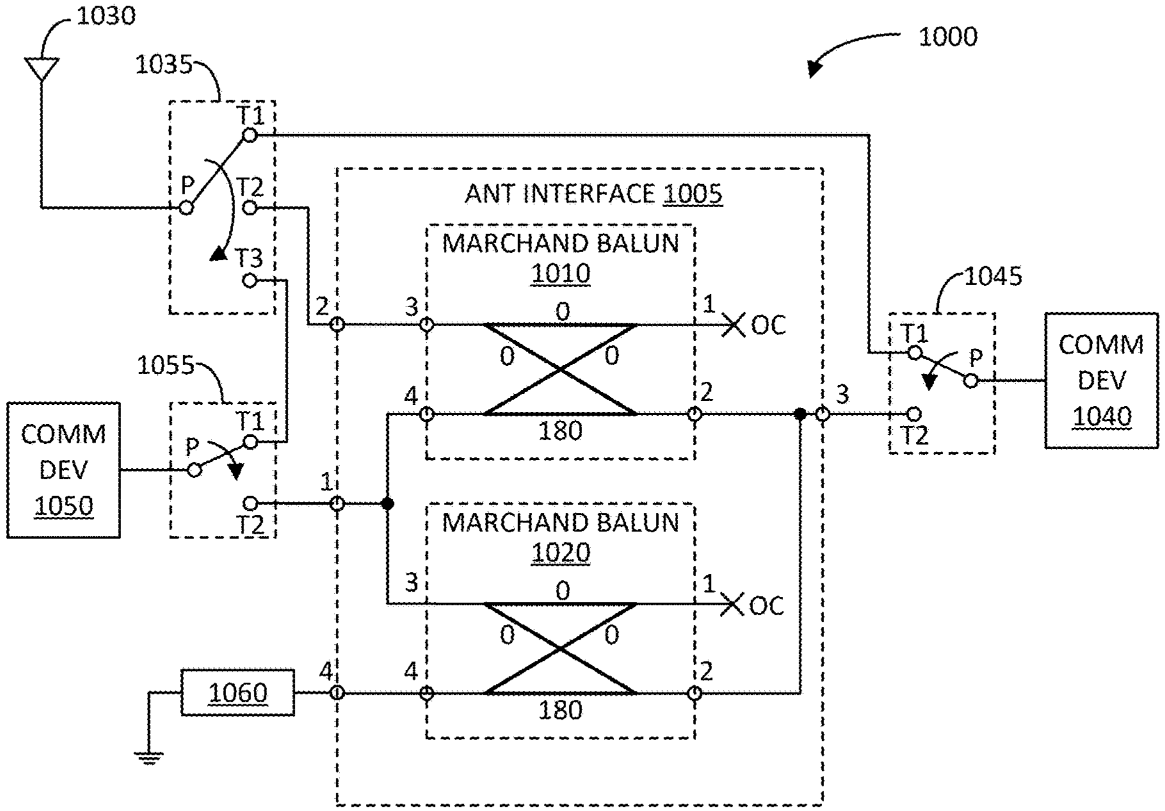
FIG. 10 illustrates a block diagram of another example wireless communication device including a multi-communication device antenna interface in accordance with another aspect of the disclosure.

FIG. 10 illustrates a block diagram of another example wireless communication device 1000 in accordance with another aspect of the disclosure. Similarly, the wireless communication device 1000 includes a set of one or more switching devices configured to: (1) couple both active first and second communication devices to an antenna via an antenna interface while the antenna interface substantially isolates the devices from each other as previously discussed with reference to wireless communication devices 700 and 800; or (2) couple an active one of first or second communication device to an antenna while bypassing an antenna interface, and isolating an inactive one of the first or second communication device from the antenna. In this example, the wireless communication device 1000 is based on wireless communication device 700 previously discussed. However, it shall be understood that the wireless communication device 1000 may be based on wireless communication device 800 as well. For example, in the case of wireless communication device 800, a pair of switching devices (e.g., switching devices 1045 and 1055 as discussed further herein) may be coupled to ports 3A/3B and 1 of the antenna interface via impedance matching circuits 845 and 855, respectively.

In this regard, the wireless communication device 1000 includes an antenna interface 1005 implemented per antenna interface 705 as indicated by the same antenna interface port numbering and port numbering of first and second Marchand baluns 1010 and 1020, as previously discussed in detail. The wireless communication device 1000 further includes a first switching device 1035, a second switching device 1045, and a third switching device 1055. The switching device 1035 may be configured as a single-pole-triple-throw (SPTT) switching device, and each of the second and third switching devices 1045 and 1055 may be implemented as a single-pole-double-throw (SPDT) switching.

The SPTT switching device 1035 includes a pole (P) coupled to an antenna 1030, a first throw (T1) coupled to a first throw (T1) of the SPDT switching device 1045, a second throw (T2) coupled to port 2 of the antenna interface 1005, and a third throw (T3) coupled to a first throw (T1) of the SPDT switching device 1055. The SPDT switching device 1045 includes a pole (P) coupled to a first communication device 1040, and a second throw (T2) coupled to port 3 of the antenna interface 1005. The SPDT switching device 1055 includes a pole (P) coupled to a second communication device 1050, and a second throw (T2) coupled to port 1 of the antenna interface 1005.

In a first mode of operation where the first communication device 1040 is active and the second communication device 1050 is inactive, the SPTT switching device 1035 is configured to couple its pole (P) to its first throw (T1), the SPDT switching device 1045 is configured to couple its pole (P) to its first throw (T1), and the SPDT switching device 1055 is configured to couple its pole (P) to its second throw (T2). In this configuration, the "active" first communication device 1040 is coupled to the antenna 1030 while bypassing the antenna interface 1005, and the "inactive" second communication device 1050 is substantially isolated from the antenna 1030 as it is coupled to the bypassed antenna interface 1005. This configuration reduces the insertion loss between the "active" first communication device 1040 and the antenna 1030 compared to if the first communication device 1040 where to be coupled to the antenna 1030 via the antenna interface 1005.

In a second mode of operation where the first communication device 1040 is inactive and the second communication device 1050 is active, the SPTT switching device 1035 is configured to couple its pole (P) to its third throw (T3), the SPDT 1045 is configured to couple its pole (P) to its second throw (T2), and the SPDT 1055 is configured to couple its pole (P) to its first throw (T1). In this configuration, the "active" second communication device 1050 is coupled to the antenna 1030 while bypassing the antenna interface, and the "inactive" first communication device 1040 is substantially isolated from the antenna 1030 as it is coupled to the bypassed antenna interface 1005. This configuration reduces the insertion loss between the "active" second communication device 1050 and the antenna 1030 compared to if the second communication device 1050 where to be coupled to the antenna 1030 via the antenna interface 1005.

In a third mode of operation where both the first and second communication devices 1040 and 1050 are active, the SPTT switching device 1035 is configured to couple its pole (P) to its second throw (T2), the SPDT switching device 1045 is configured to couple its pole (P) to its second throw (T2), and the SPDT switching device 1055 is configured to couple its pole (P) to its second throw (T2). In this configuration, the first and second communication devices 1040 and 1050 are coupled to the antenna 1030 via the antenna interface 1005, while the antenna interface 1005 substantially isolates the first communication device 1040 from the second communication device 1050 as previously discussed.

Figure 11:
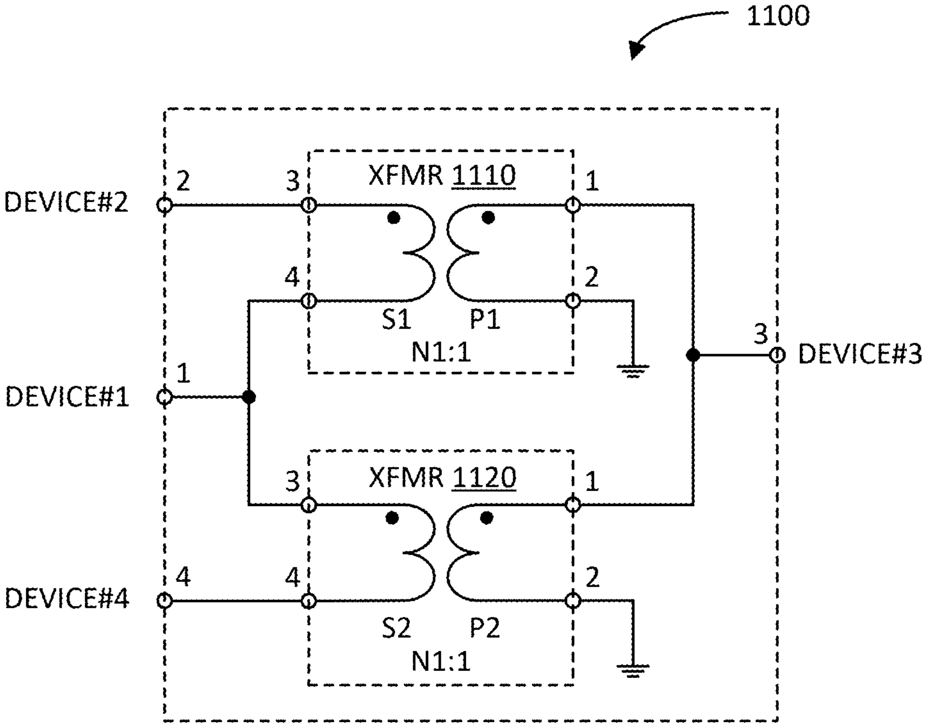
FIG. 11 illustrates a block diagram of an example antenna interface in accordance with another aspect of the disclosure.

FIG. 11 illustrates a block diagram of an example antenna interface 1100 in accordance with another aspect of the disclosure. The antenna interface 1100 may be based on antenna interface 305 previously discussed. However, it shall be understood that the antenna interface 1100 may be based on any of the antenna interface 405, 505, 605, or 905. The antenna interface 1100 includes a first transformer (XFMR) 1110 including a primary winding P1 and a secondary winding S1. The antenna interface 1100 further includes a second transformer (XFMR) 1120 including a primary winding P2 and a secondary winding S2.

More specifically, the antenna interface 1100 includes a first port "1" coupled (or configured to couple) to a first device #1, a second port "2" coupled (or configured to couple) to a second device #2, a third port "3" coupled (or configured to couple) to a third device #3, and a fourth port "4" coupled (or configured to couple) to a fourth device #4. The primary winding P1 of the first transformer 1110 includes a first end "1" coupled to the third port 3 of the antenna interface 1100. The primary winding P1 of the first transformer 1110 includes a second end "2" coupled to a reference potential electrode (e.g., ground). The secondary winding S1 of the first transformer 1110 includes a first end "3" coupled to the second port 2 of the antenna interface 1100. And, the secondary winding S1 of the first transformer 1110 includes a second end "4" coupled to the first port 1 of the antenna interface 1100.

The primary winding P2 of the second transformer 1120 includes a first end "1" coupled to the third port 3 of the antenna interface 1100. The primary winding P2 of the second transformer 1120 includes a second end "2" coupled to the reference potential electrode. The secondary winding S2 of the second transformer 1120 includes a first end "3" coupled to the first port 1 of the antenna interface 1100. And, the secondary winding S2 of the second transformer 1120 includes a second end "4" coupled to the fourth port 4 of the antenna interface 1100.

If the impedances of the devices #1-4 are set in accordance with equations 1~4 (e.g., where device #1 takes the place of the second communication device 350, device #2 takes the place of the antenna 330, device #3 takes the place of the first communication device 340, and device #4 takes the place of the ballast load 360), the transmission port pairs are 1-2, 2-3, and 1-4, and the isolation port pairs 1-3 and 2-4. Accordingly, devices, such as communication devices (e.g., transceivers, transmitters, or receivers), for which isolation between them is desired, may be coupled to isolation port pair 1-3 or 2-4, and the remaining devices, such as antenna and ballast load, may be coupled to the other isolation port pair 2-4 or 1-3, respectively.

Thus, in a first configuration, device #1 and device #3 are communication devices (e.g., transceivers, transmitters, or receivers), device #2 is an antenna, and device #4 is a ballast load. This first configuration is the same used in antenna interfaces 305, 405, 605, and 905. In a second configuration, device #1 and device #3 are communication devices (e.g., transceivers, transmitters, or receivers), device #2 is a ballast load, and device #4 is an antenna. In a third configuration, device #2 and device #4 are communication devices (e.g., transceivers, transmitters, or receivers), device #1 is an antenna, and device #3 is a ballast load. In a fourth configuration, device #2 and device #4 are communication devices (e.g., transceivers, transmitters, or receivers), device #1 is a ballast load, and device #3 is an antenna.

Figure 12:
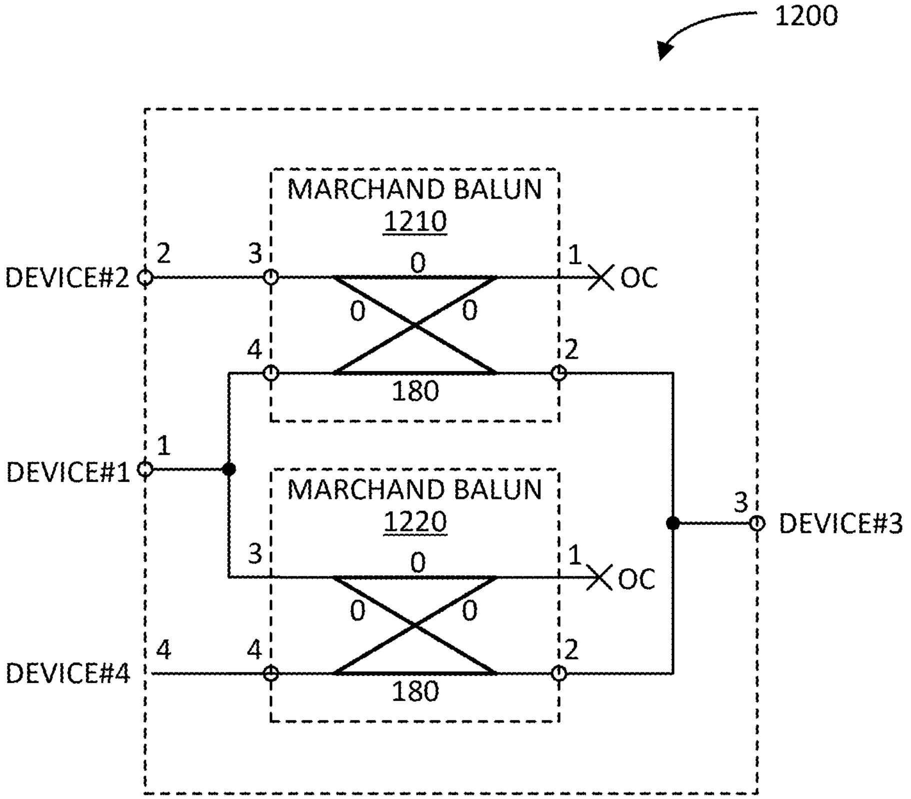
FIG. 12 illustrates a block diagram of another example antenna interface in accordance with another aspect of the disclosure.

FIG. 12 illustrates a block diagram of another example antenna interface 1200 in accordance with another aspect of the disclosure. The antenna interface 1200 may be based on antenna interface 705 previously discussed. However, it shall be understood that the antenna interface 1200 may be based on any of the antenna interface 805 or 1005.

The antenna interface 1200 includes a first Marchand balun 1210 and a second Marchand balun 1220. The antenna interface 1200 includes a first port "1" coupled (or configured to couple) to a first device #1, a second port "2" coupled (or configured to couple) to a second device #2, a third port "3" coupled (or configured to couple) to a third device #3, and a fourth port "4" coupled (or configured to couple) to a fourth device #4.

The first Marchand balun 1210 includes a first port "1" that terminates at an open circuit (OC), a second port "2" coupled to the third port 3 of the antenna interface 1200, a third port "3" coupled to the second port 2 of the antenna interface 1200, and a fourth port "4" coupled to the first port 1 of the antenna interface 1200. Similarly, the second Marchand balun 1220 includes a first port "1" that terminates at an open circuit (OC), a second port "2" coupled to the third port 3 of the antenna interface 1200, a third port "3" coupled to the first port 1 of the antenna interface 1200, and a fourth port "4" coupled to the fourth port 4 of the antenna interface 1200. In both the first and second Marchand baluns 1210 and 1220, the third port 3 is the in-phase (0°) port with respect to the second port 2, and the fourth port 4 is the out-of-phase (180°) port with respect to the second port 2.

Devices, such as communication devices (e.g., transceivers, transmitters, or receivers), for which isolation between them is desired, may be coupled to isolation port pair 1-3 or 2-4 of the antenna interface 1200, and the remaining devices, such as antenna and ballast load, may be coupled to the other isolation port pair 2-4 or 1-3 of the antenna interface 1200, respectively.

Accordingly, in a first configuration, device #1 and device #3 are communication devices (e.g., transceivers, transmitters, or receivers), device #2 is an antenna, and device #4 is a ballast load. This first configuration is the same used in antenna interfaces 705, 805, and 1005. In a second configuration, device #1 and device #3 are communication devices (e.g., transceivers, transmitters, or receivers), device #2 is a ballast load, and device #4 is an antenna. In a third configuration, device #2 and device #4 are communication devices (e.g., transceivers, transmitters, or receivers), device #1 is an antenna, and device #3 is a ballast load. In a fourth configuration, device #2 and device #4 are communication devices (e.g., transceivers, transmitters, or receivers), device #1 is a ballast load, and device #3 is an antenna.

Figure 13:
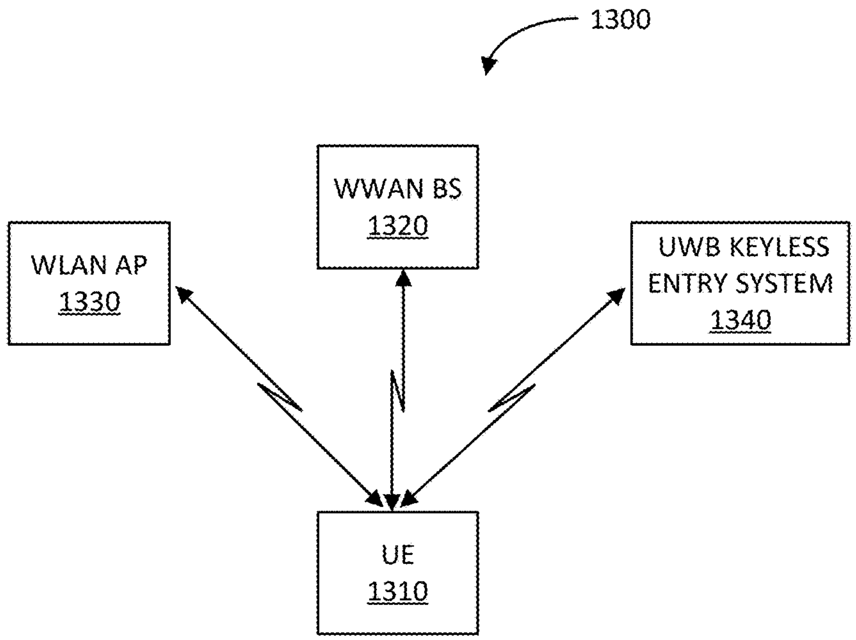
FIG. 13 illustrates a block diagram of an example wireless communication system in accordance with another aspect of the disclosure.

FIG. 13 illustrates a block diagram of an example wireless communication system 1300 in accordance with another aspect of the disclosure. The wireless communication system 1300 includes a user equipment (UE) 1310, a wireless wide area network (WWAN) base station (BS) 1320, a wireless local area network (WLAN) access point (AP) 1330, and an ultra wideband (UWB) keyless entry system 1340. The UE 1310 may include one or more transceivers, including any of the antenna interfaces 305, 405, 505, 605, 705, 805, 905, 1005, 1100, and 1200 previously discussed, to wirelessly communicate with one or more of the WWAN BS 1320, WLAN AP 1330, and UWB keyless entry system 1340.

Figure 14:
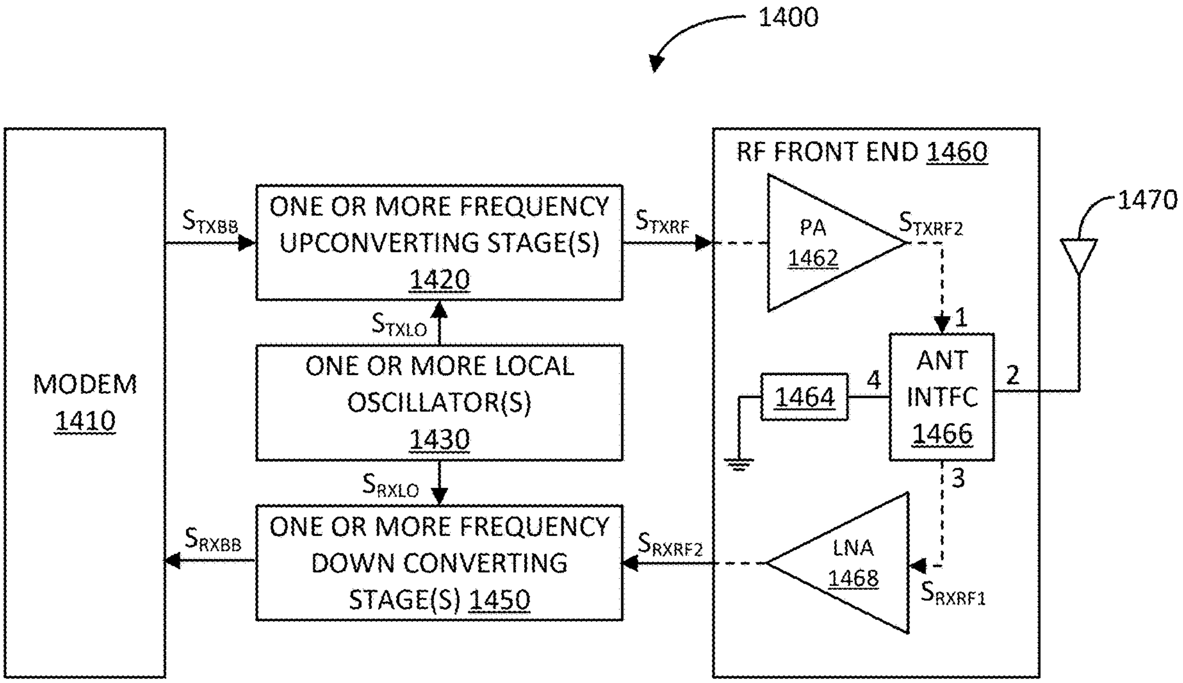
FIG. 14 illustrates a block diagram of an example transceiver in accordance with another aspect of the disclosure.

FIG. 14 illustrates a block diagram of an example transceiver 1400 in accordance with another aspect of the disclosure. The transceiver 1400 may be used by the UE 1310 to wirelessly communicate with any of the WWAN BS 1320, WLAN AP 1330, and UWB keyless entry system 1340.

The transceiver 1400 includes a modem 1410, one or more frequency upconverting stage(s) 1420, one or more local oscillator(s) 1430, one or more frequency downconverting stage(s) 1450, a radio frequency (RF) front end 1460, and an antenna 1470 (e.g., an antenna array). The RF front end 1460, in turn, includes a power amplifier (PA) 1462, an antenna interface 1466, and a low noise amplifier (LNA) 1468. The antenna interface 1466 may be implemented per any of the antenna interfaces 305, 405, 505, 605, 705, 805, 905, 1005, 1100, and 1200 previously discussed.

With regard to signal transmission, the modem 1410 is configured to generate a transmit baseband signal $S_{TXBB}$. The one or more frequency upconverting stage(s) 1420 is configured to frequency upconvert the transmit baseband signal $S_{TXBB}$ (e.g., from baseband (BB) to radio frequency (RF) directly or via one or more intermediate frequencies (IFs)) using one or more transmit local oscillator signal(s) $S_{TXLO}$ generated by the one or more local oscillator(s) 1430 to generate a transmit RF signal $S_{TXRF1}$. The PA 1462 is configured to amplify the transmit RF signal $S_{TXRF1}$ to generate an output RF signal $S_{TXRF2}$. The output RF signal $S_{TXRF2}$ is provided to the antenna 1470 via ports 1-2 of the antenna interface 1466. The antenna 1470 is configured to wirelessly radiate the output RF signal $S_{TXRF2}$. As per the antenna interfaces previously discussed, a ballast load 1464 is coupled between port 4 of the antenna interface 1466 and a reference potential electrode (e.g., ground).

With regard to signal reception, the antenna 1470 may wirelessly sense/pickup a received RF signal $S_{RXRF1}$, which is provided to the LNA 1468 via ports 2-3 of the antenna interface 1466. The LNA 1468 is configured to amplify the received RF signal $S_{RXRF1}$ to generate an amplified received RF signal $S_{RXRF2}$. The one or more frequency downconverting stage(s) 1450 is configured to frequency downconvert the amplified received RF signal $S_{RXRF2}$ (e.g., from RF to BB directly or via one or more IFs) using one or more received local oscillator signal(s) $S_{RXLO}$ generated by the one or more local oscillator(s) 1430 to generate a received BB signal $S_{RXBB}$. The modem 1410 may receive and process the received BB signal $S_{RXBB}$ to extract and/or recover information or data therein.

The components of the transceiver 1400 may be implemented as separate components or integrated into one or more ICs in various different manners. For example, the modem 1410 may be integrated with the frequency converting components 1420, 1430, and 1450 into a single IC. Similarly, the frequency converting components 1420, 1430, and 1450 may be integrated with the RF front end 1460 into a single IC. Or, the modem 1410, the frequency converting components 1420, 1430, and 1450, and the RF front end 1460 may be integrated into a single IC.

Figure 15:
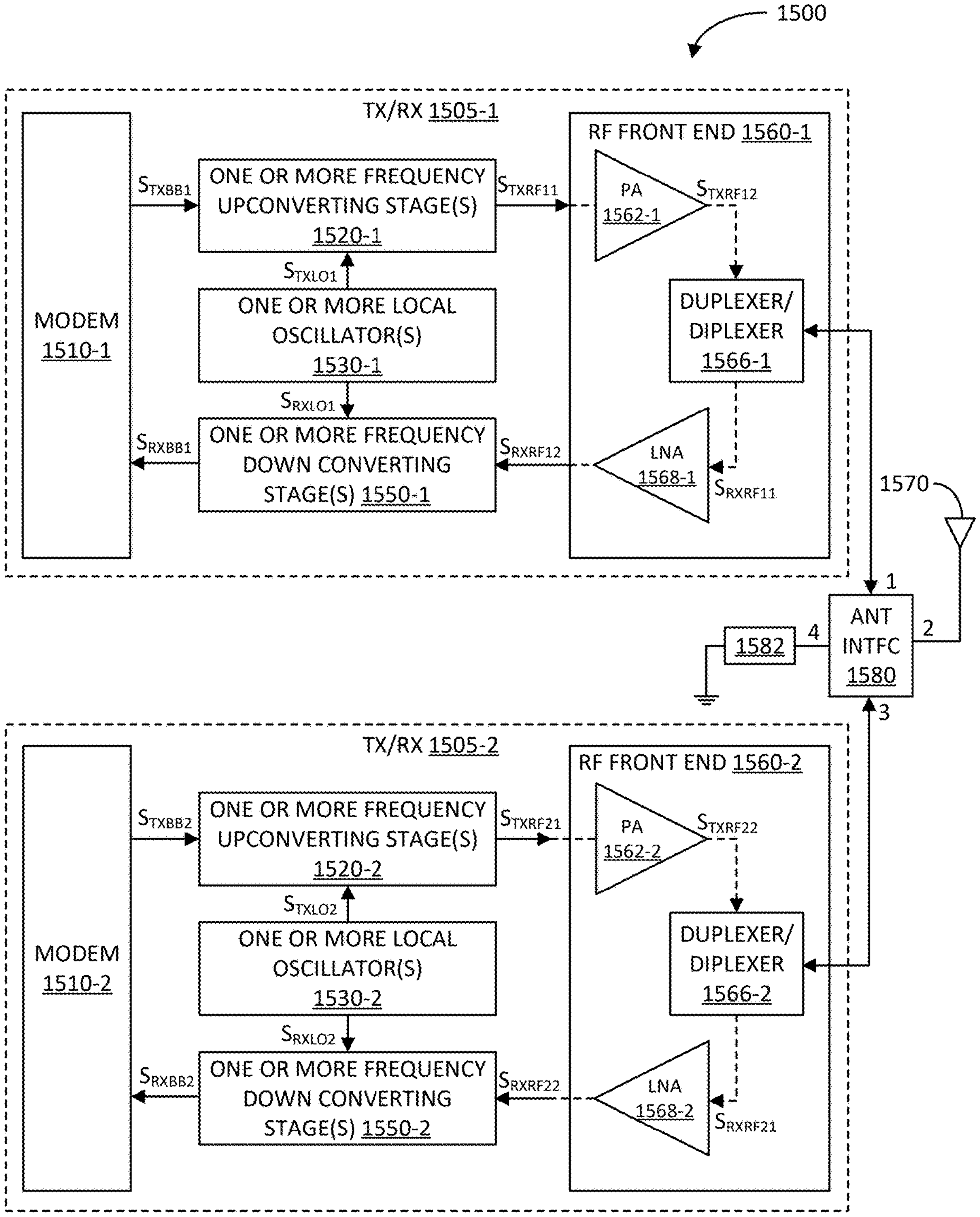
FIG. 15 illustrates a block diagram of an example user equipment (UE) in accordance with another aspect of the disclosure.

FIG. 15 illustrates a block diagram of an example user equipment (UE) 1500 in accordance with another aspect of the disclosure. The UE 1500 may be an example detailed implementation of the UE 1310 of wireless communication system 1300.

In particular, the UE 1500 includes a first transceiver (Tx/Rx) 1505-1 and a second transceiver Tx/Rx 1505-2. Each of the first and second transceivers 1505-1 and 1505-2 may be implemented similar to transceiver 1400 previously discussed. That is, the first transceiver 1505-1 includes a modem 1510-1, one or more frequency upconverting stage(s) 1520-1, one or more local oscillator(s) 1530-1, one or more frequency downconverting stage(s) 1550-1, and an RF front end 1560-1. The RF front end 1560-1 includes a PA 1562-1, a duplexer or diplexer 1566-1, and an LNA 1568-1. The first transceiver 1505-1 may be configured to generate/process baseband, LO, and RF signals $S_{TXBB1}$, $S_{RXBB1}$, $S_{TXLO1}$, $S_{RXLO1}$, $S_{TXRF11}$, $S_{TXRF12}$, $S_{RXRF11}$, and $S_{RXRF12}$ similar to transceiver 1400 previously discussed.

Similarly, the second transceiver 1505-2 includes a modem 1510-2, one or more frequency upconverting stage(s) 1520-2, one or more local oscillator(s) 1530-2, one or more frequency downconverting stage(s) 1550-2, and an RF front end 1560-2. The RF front end 1560-2 includes a PA 1562-2, a duplexer or diplexer 1566-2, and an LNA 1568-2. The second transceiver 1505-2 may be configured to generate/process baseband, LO, and RF signals $S_{TXBB2}$, $S_{RXBB2}$, $S_{TXLO2}$, $S_{RXLO2}$, $S_{TXRF21}$, $S_{TXRF22}$, $S_{RXRF21}$, and $S_{RXRF22}$ similar to transceiver 1400 previously discussed.

The UE 1500 further includes an antenna interface 1580, which may be implemented per any of the antenna interfaces 305, 405, 505, 605, 705, 805, 905, 1005, 1100, and 1200 previously discussed. The antenna interface 1580 includes a first port "1" coupled to the duplexer or diplexer 1566-1 of the first transceiver 1505-1, a second port "2" coupled to an antenna 1570 (e.g., an antenna array), and a third port "3" coupled to the duplexer or diplexer 1566-2 of the second transceiver 1505-2. The UE 1500 further includes a ballast load 1582 coupled between a fourth port "4" of the antenna interface 1580 and a reference potential electrode (e.g., ground).

In this configuration, the transmit and received RF signals $S_{TXRF12}$ and $S_{RXRF11}$ of the first transceiver 1505-1 is routed between the duplexer or diplexer 1566-1 and the antenna 1570 via ports 1-2 of the antenna interface 1580. Similarly, the transmit and received RF signals $S_{TXRF22}$ and $S_{RXRF21}$ of the second transceiver 1505-2 is routed between the duplexer or diplexer 1566-2 and the antenna 1570 via ports 2-3 of the antenna interface 1580. As an example, the transceivers 1505-1/1505-2 may be implemented to process signals in accordance with WWAN/WLAN, WWAN/UWB, WLAN/UWB, or a pair of different or same protocols, respectively.

Although, in this example, the components of the first transceiver 1505-1 are shown separate from the components of the second transceiver 1505-2, it shall be understood that the first and second transceivers 1505-1 and 1505-2 may share one or more components. The components of the first and second transceivers 1505-1 and 1505-2 may be separate components or integrated into ICs in various different manners (e.g., modems 1510-1 and 1510-2 may be integrated into a single IC or implemented in separate ICs, the modems 1510-1/2 may be integrated with the frequency converting circuitry 1520-1/2, 1530-1/2, and 1550-1/2 in any combination or implemented as separate components, the RF front ends 1560-1 to 1560-2 may be integrated with the frequency converting circuitry 1520-1/2, 1530-1/2, and 1550-1/2 and/or with the modems 1510-1 and 1510-2 into one or more ICs in various different manners or implemented as separate components. The first and second transceivers 1505-1 and 1502 may be examples of the communication devices coupled to ports 1 and 3 of any of the antenna interfaces described herein.

Figure 16:
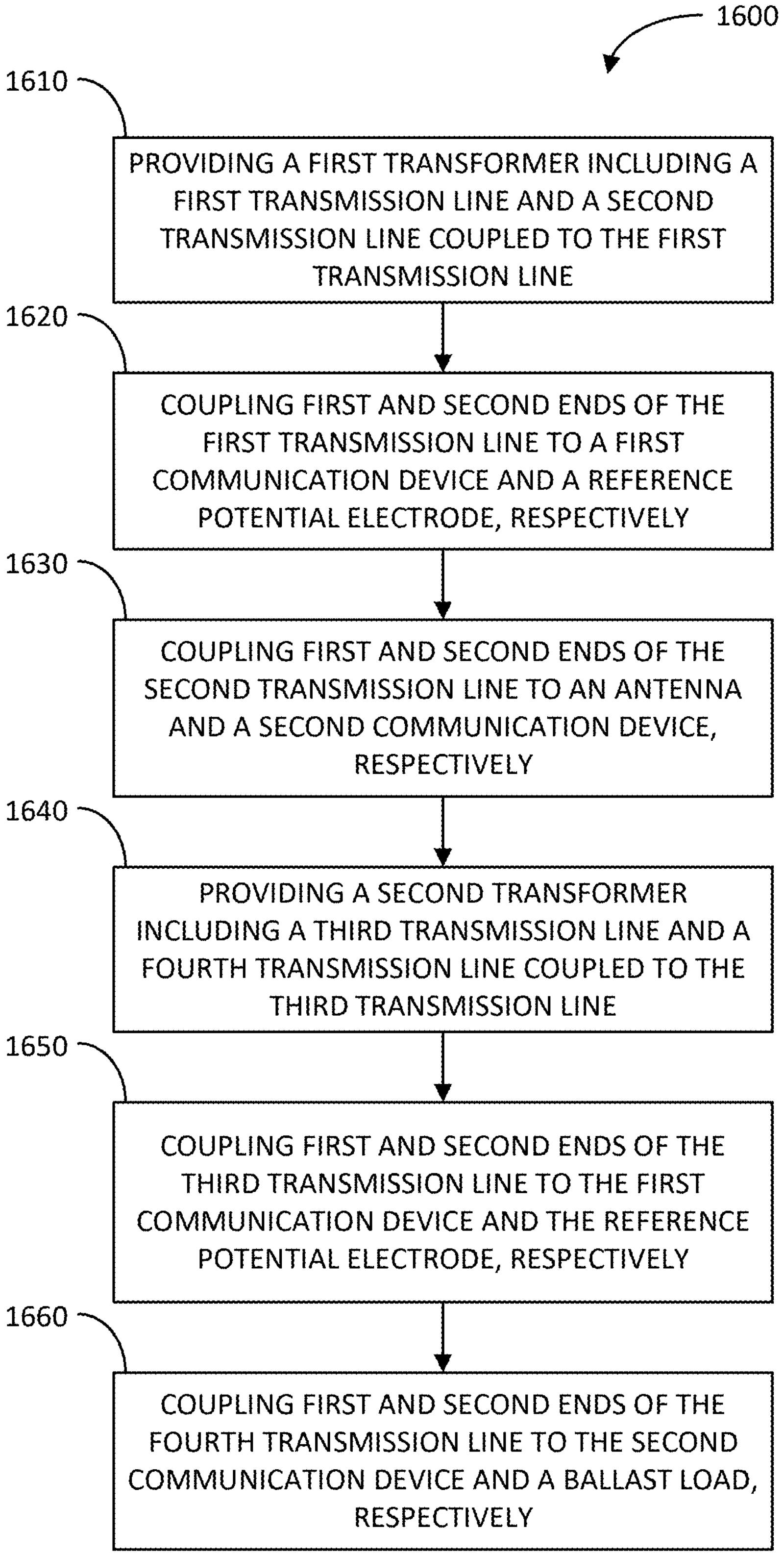
FIG. 16 illustrates a flow diagram of an example method of manufacturing an antenna interface in accordance with another aspect of the disclosure.

FIG. 16 illustrates a flow diagram of an example method 1600 of manufacturing an antenna interface in accordance with another aspect of the disclosure. The method 1600 includes providing a first transformer including a first transmission line and a second transmission line coupled to the first transmission line (block 1610). The method 1600 further includes coupling first and second ends of the first transmission line to a first communication device and a reference potential electrode, respectively (block 1620). Additionally, the method 1600 includes coupling first and second ends of the second transmission line to an antenna and a second communication device, respectively (block 1630).

The method 1600 further includes providing a second transformer including a third transmission line and a fourth transmission line coupled to the third transmission line (block 1640). Additionally, the method 1600 includes coupling first and second ends of the third transmission line to the first communication device and the reference potential electrode, respectively (block 1650). Further, the method 1600 includes coupling first and second ends of the fourth transmission line to the second communication device and a ballast load, respectively (block 1660).

Figure 17:
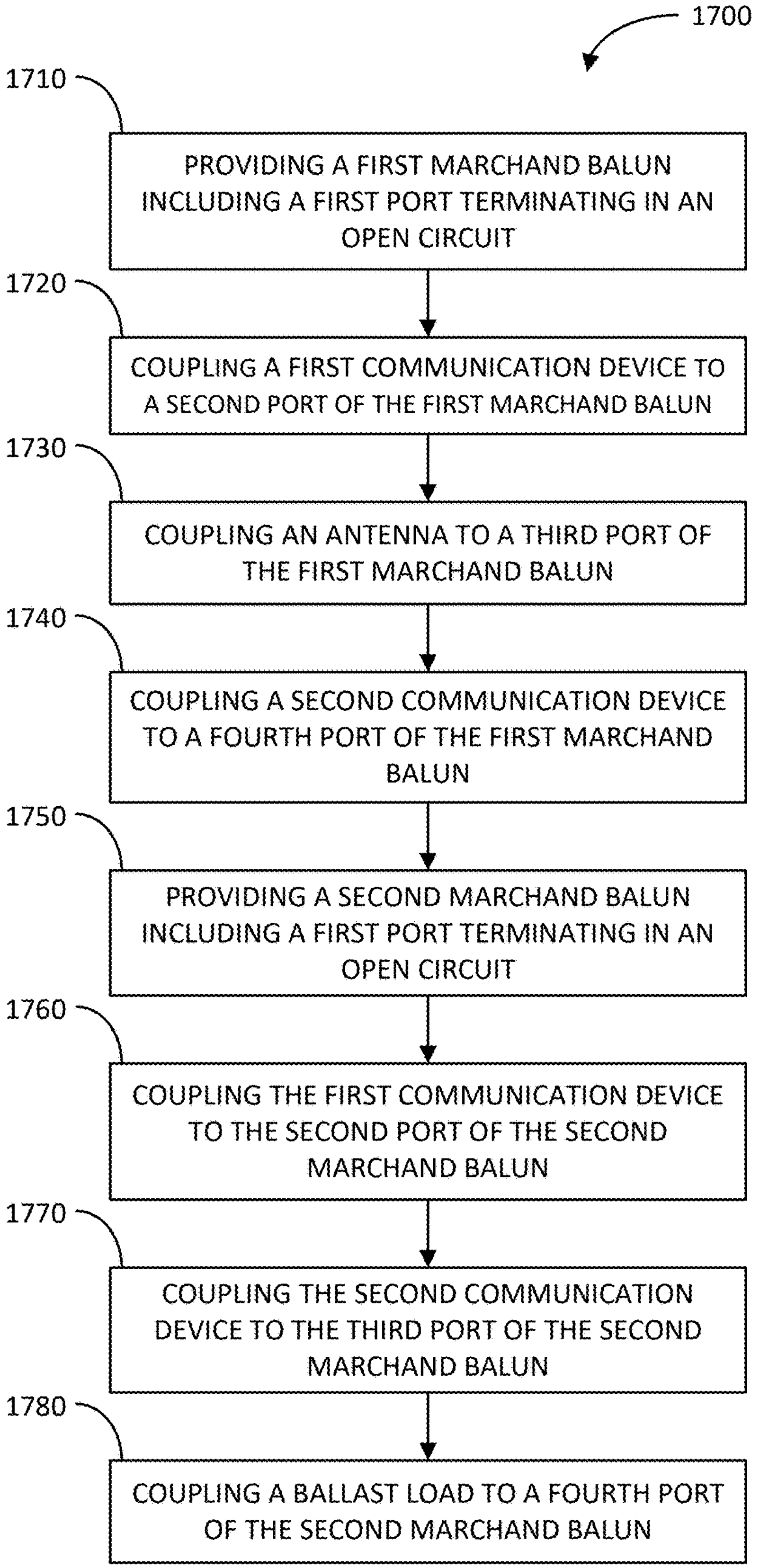
FIG. 17 illustrates a flow diagram of another example method of manufacturing an antenna interface in accordance with another aspect of the disclosure.

FIG. 17 illustrates a flow diagram of another example method 1700 of manufacturing an antenna interface in accordance with another aspect of the disclosure. The method 1700 includes providing a first Marchand balun including a first port terminating in an open circuit (block 1710). The method 1700 further includes coupling a first communication device to a second port of the first Marchand balun (block 1720). Additionally, the method 1700 includes coupling an antenna to a third port of the first Marchand balun (1730). The method 1700 also includes coupling a second communication device to a fourth port of the first Marchand balun (block 1740).

The method 1700 further includes providing a second Marchand balun including a first port terminating in an open circuit (block 1750). The method 1700 also includes coupling the first communication device to the second port of the second Marchand balun (block 1760). Additionally, the method 1700 includes coupling the second communication device to the third port of the second Marchand balun (block 1770). Further, the method 1700 includes coupling a ballast load to a fourth port of the second Marchand balun (block 1780).

Figure 18:
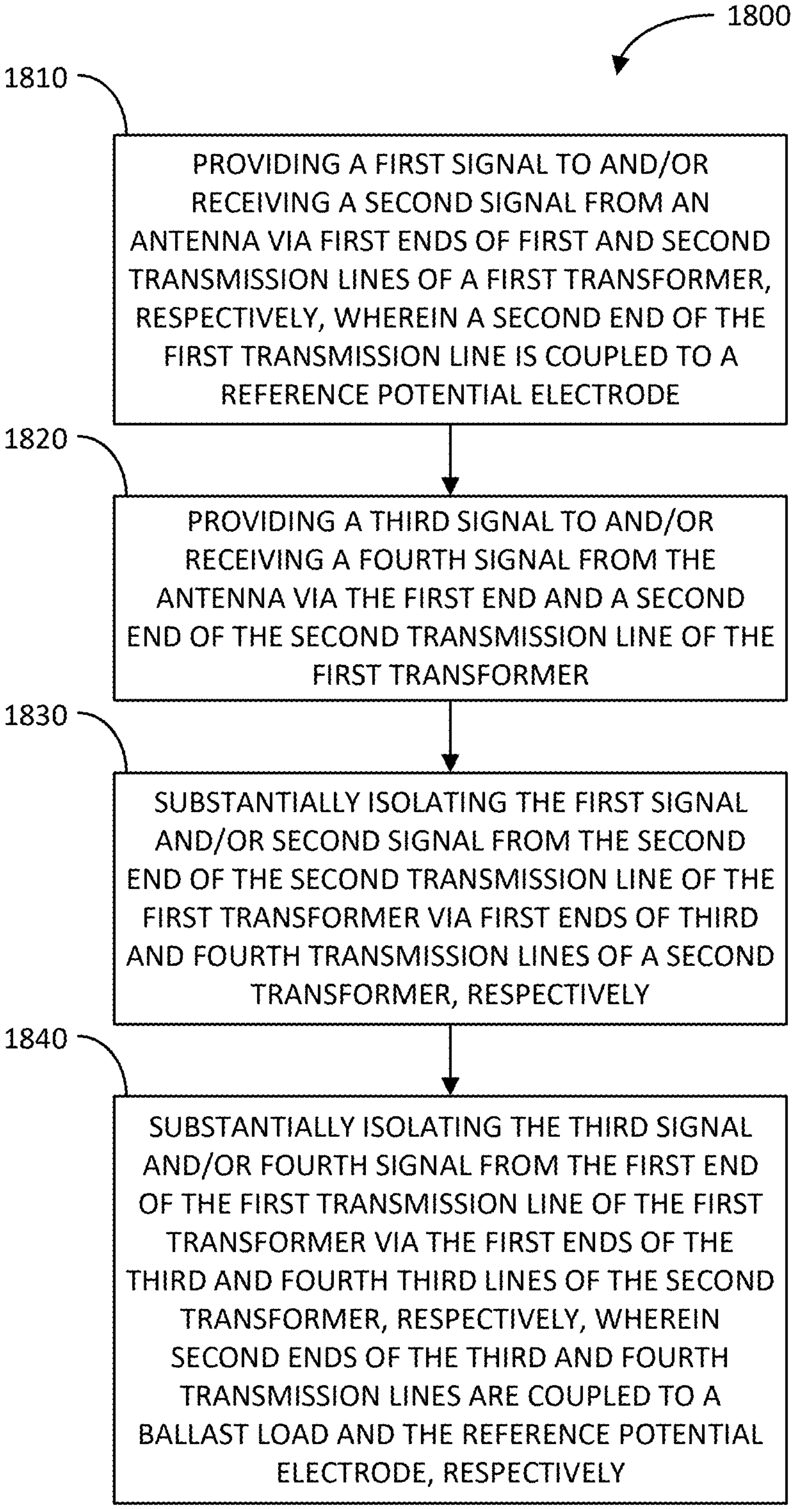
FIG. 18 illustrates a flow diagram of an example method of transmitting and/or receiving signals in accordance with another aspect of the disclosure.

FIG. 18 illustrates a flow diagram of an example method 1800 of transmitting and/or receiving signals in accordance with another aspect of the disclosure. The method 1800 includes providing a first signal to and/or receiving a second signal from an antenna via first ends of first and second transmission lines of a first transformer, respectively, wherein a second end of the first transmission line is coupled to a reference potential electrode (block 1810). The method 1800 further includes providing a third signal to and/or receiving a fourth signal from the antenna via the first end and a second end of the second transmission line of the first transformer (block 1820).

Additionally, the method 1800 includes substantially isolating the first signal and/or second signal from the second end of the second transmission line of the first transformer via first ends of third and fourth transmission lines of a second transformer, respectively (block 1830). Further, the method 1800 includes substantially isolating the third signal and/or fourth signal from the first end of the first transmission line of the first transformer via the first ends of the third and fourth third lines of the second transformer, respectively, wherein second ends of the third and fourth transmission lines are coupled to a ballast load and the reference potential electrode, respectively (block 1840).

Figure 19:
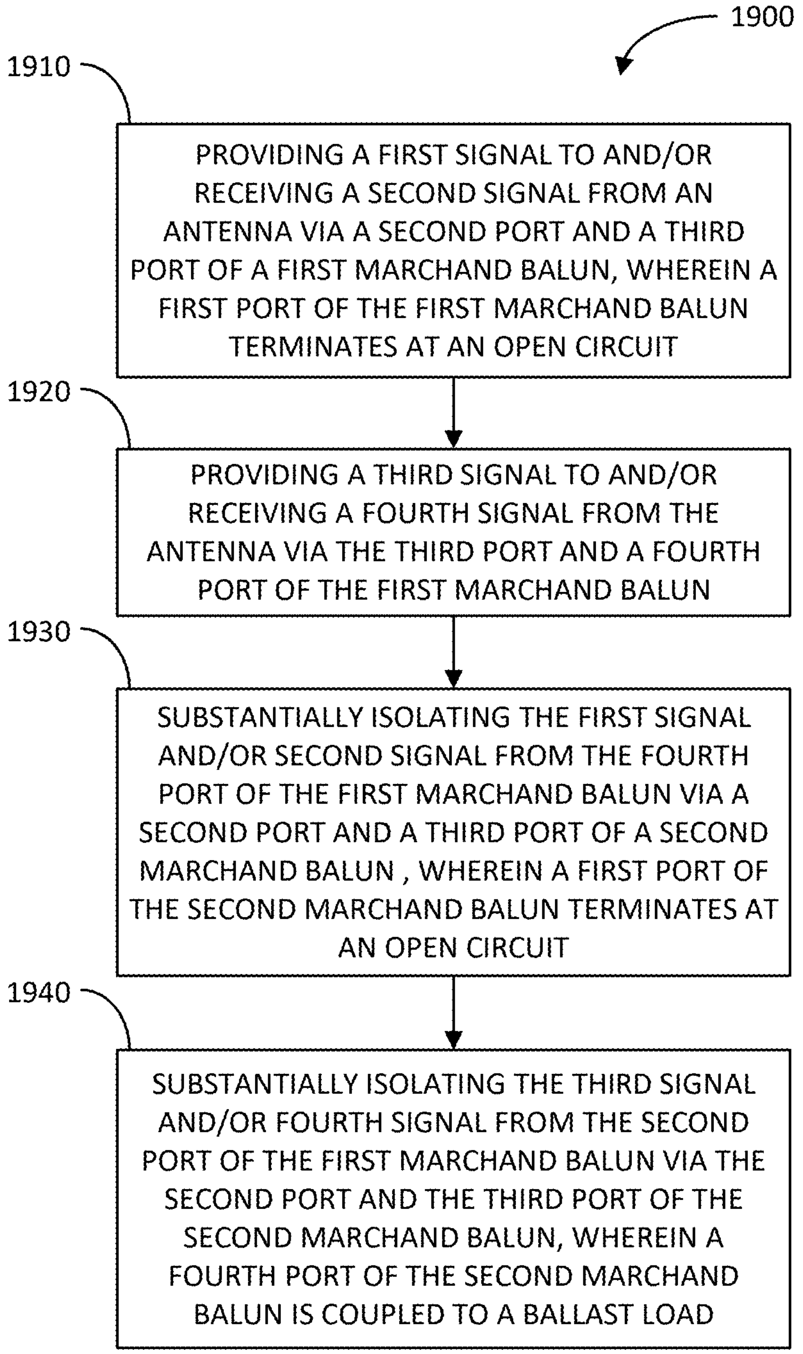
FIG. 19 illustrates a flow diagram of another example method of transmitting and/or receiving signals in accordance with another aspect of the disclosure.

FIG. 19 illustrates a flow diagram of another example method 1900 transmitting and/or receiving signals in accordance with another aspect of the disclosure. The method 1900 includes providing a first signal to and/or receiving a second signal from an antenna via a second port and a third port of a first Marchand balun, wherein a first port of the first Marchand balun terminates at an open circuit (block 1910). The method 1900 further includes providing a third signal to and/or receiving a fourth signal from the antenna via the third port and a fourth port of the first Marchand balun (block 1920).

Additionally, the method 1900 includes substantially isolating the first signal and/or second signal from the fourth port of the first Marchand balun via a second port and a third port of a second Marchand balun, wherein a first port of the second Marchand balun terminates at an open circuit (block 1930). The method 1900 also includes substantially isolating the third signal and/or fourth signal from the second port of the first Marchand balun via the second port and the third port of the second Marchand balun, wherein a fourth port of the second Marchand balun is coupled to a ballast load (block 1940).

The following provides an overview of aspects of the present disclosure:

Aspect 1: An apparatus, comprising: an antenna interface, comprising: a first transformer including a first transmission line and a second transmission line coupled to the first transmission line, wherein the first transmission line includes first and second ends configured to couple to a first communication device and a reference potential electrode, respectively, and wherein the second transmission line includes first and second ends configured to couple to an antenna and a second communication device, respectively; and a second transformer including a third transmission line and a fourth transmission line coupled to the third transmission line, wherein the third transmission line includes first and second ends configured to couple to the first communication device and the reference potential electrode, respectively, and wherein the fourth transmission line includes first and second ends configured to couple to the second communication device and a ballast load, respectively.

Aspect 2: The apparatus of aspect 1, wherein the first transformer is asymmetrical with respect to the second transformer in that a width of the first or second transmission line differs from a width of the third or fourth transmission line, respectively.

Aspect 3: The apparatus of aspect 1, wherein the first transformer is asymmetrical with respect to the second transformer in that a width of the first or second transmission line is greater than a width of the third or fourth transmission line, respectively.

Aspect 4: The apparatus of claim 1, wherein the first transformer is asymmetrical with respect to the second transformer in that a width of the first or second transmission line is greater than a width of the third or fourth transmission line by at least 25 percent, respectively.

Aspect 5: The apparatus of any one of aspects 1-4, wherein the first transformer is asymmetrical with respect to the second transformer in that a length of the first or second transmission line differs from a length of the third or fourth transmission line, respectively.

Aspect 6: The apparatus of any one of aspects 1-4, wherein the first transformer is asymmetrical with respect to the second transformer in that a length of the first or second transmission line is greater than a length of the third or fourth transmission line, respectively.

Aspect 7: The apparatus of any one of aspects 1-6, wherein the antenna interface further comprises: a first capacitor coupled across the first and second ends of the second transmission line; and a second capacitor coupled across the first and second ends of the fourth transmission line.

Aspect 8: The apparatus of any one of aspects 1-7, further comprising: the first communication device; and an impedance matching circuit coupled between the first communication device and the first ends of the first and third transmission lines, respectively.

Aspect 9: The apparatus of aspect 8, wherein the impedance matching circuit comprises a shunt inductor and a series capacitor.

Aspect 10: The apparatus of any one of aspects 1-9, further comprising: the second communication device; and an impedance matching circuit coupled between the second communication device and the second and first ends of the second and fourth transmission lines, respectively.

Aspect 11: The apparatus of aspect 10, wherein the impedance matching circuit comprises a shunt inductor and a series capacitor.

Aspect 12: The apparatus of any one of aspects 1-11, further comprising: a set of one or more switching devices configured to: couple an active one of the first or second communication device to the antenna while bypassing the antenna interface, and substantially isolate an inactive one of the first or second communication device from the antenna in accordance with a first mode of operation; or couple the first and second communication devices to the antenna via the antenna interface when both are active in accordance with a second mode of operation.

Aspect 13: The apparatus of aspect 12, wherein the set of one or more switching devices comprises: a single-pole-triple throw (SPTT) switching device including a pole configured to couple to the antenna, a first throw, a second throw coupled to the first end of the second transmission line, and a third throw; a first single-pole-double-throw (SPDT) switching device including a pole configured to couple to the first communication device, a first throw coupled to the first throw of the SPTT switching device, and a second throw coupled to the first ends of the first and third transmission lines, respectively; and a second SPDT switching device including a pole configured to couple to the second communication device, a first throw coupled to the third throw of the SPTT switching device, and a second throw coupled to the second and first ends of the second and fourth transmission lines, respectively.

Aspect 14: The apparatus of aspect 13, further comprising: a first impedance matching circuit coupled between the second throw of the first SPDT switching device and the first ends of the first and third transmission lines, respectively; and a second impedance matching circuit coupled between the second throw of the second SPDT switching device and the second and first ends of the second and fourth transmission lines, respectively.

Aspect 15: The apparatus of any one of aspects 1-14, wherein the first communication device is configured to transmit and/or receive signals within a first communication band, wherein the second communication device is configured to transmit and/or receive signals within a second communication band, wherein the first and second communication bands overlap in frequency.

Aspect 16: The apparatus of any one of aspects 1-15, wherein the first communication device is configured to transmit and/or receive signals in accordance with a first communication protocol, wherein the second communication device is configured to transmit and/or receive signals in accordance with a second communication protocol different than or same as the first communication protocol.

Aspect 17: The apparatus of aspect 16, wherein the first and second communication protocols include any of the following: a wireless wide area network (WWAN) communication protocol, a wireless local area network (WLAN) communication protocol, an ultra-wideband (UWB) communication protocol, or Bluetooth communication protocol.

Aspect 18: The apparatus of any one of aspects 1-17, wherein the first and second communication devices each comprises a transceiver, a transmitter, or a receiver.

Aspect 19: An apparatus, comprising: an antenna interface, comprising: a first Marchand balun including a first port that terminates at an open circuit, a second port configured to couple to a first communication device, a third port configured to couple to an antenna, and a fourth port configured to couple to a second communication device; and a second Marchand balun including a first port that terminates at an open circuit, a second port configured to couple to the first communication device, a third port configured to couple to the second communication device, and a fourth port configured to couple to a ballast load.

Aspect 20: The apparatus of aspect 19, wherein each of the first or second Marchand balun comprises: first and second inductors coupled in series between the first port and the second port; a third inductor coupled between a reference potential electrode and the third port, wherein the third inductor is electromagnetically coupled to the first inductor; and a fourth inductor coupled between the fourth port and the reference potential electrode, wherein the fourth inductor is electromagnetically coupled to the second inductor.

Aspect 21: The apparatus of aspect 19, wherein each of the first or second Marchand balun comprises: first and second transmission lines coupled in series between the first port and the second port; a third transmission line coupled between a reference potential electrode and the third port, wherein the third transmission line is coupled to the first transmission line; and a fourth transmission line coupled between the fourth port and the reference potential electrode, wherein the fourth transmission line is coupled to the second transmission line.

Aspect 22: The apparatus of aspect 21, wherein the first and second communication devices are configured to process signals within first and second communication bands, respectively, wherein the first, second, third, and fourth transmission lines each have a length corresponding to a quarter wavelength associated with a frequency within the first and/or second communication band.

Aspect 23: The apparatus of aspect 21 or 22, wherein the first and second communication devices are configured to process signals within first and second communication bands, respectively, wherein the first, second, third, and fourth transmission lines each have a length corresponding to a quarter wavelength associated with a frequency within an overlapping frequency range of or between the first or second communication bands.

Aspect 24: The apparatus of any one of aspects 19-23, further comprising: the first communication device; and an impedance matching circuit coupled between the first communication device and the second ports of the first and second Marchand baluns, respectively.

Aspect 25: The apparatus of aspect 24, wherein the impedance matching circuit comprises a shunt capacitor and a pair of series inductors coupled between the first communication device and the second ports of the first and second Marchand baluns, respectively.

Aspect 26: The apparatus of any one of aspects 19-25, further comprising: the second communication device; and an impedance matching circuit coupled between the second communication device and the fourth and third ports of the first and second Marchand baluns, respectively.

Aspect 27: The apparatus of aspect 26, wherein the impedance matching circuit comprises a shunt inductor and a series capacitor.

Aspect 28: The apparatus of any one of aspects 19-27, further comprising a set of one or more switching devices configured to: couple an active one of the first or second communication device to the antenna while bypassing the antenna interface, and substantially isolate an inactive one of the first or second communication device from the antenna in accordance with a first mode of operation; or couple the first and second communication devices to the antenna via the antenna interface when both are active in accordance with a second mode of operation.

Aspect 29: The apparatus of aspect 28, wherein the set of one or more switching devices comprises: a single-pole-triple throw (SPTT) switching device including a pole configured to couple to the antenna, a first throw, a second throw coupled to the third port of the first Marchand balun, and a third throw; a first single-pole-double-throw (SPDT) switching device including a pole configured to couple to the first communication device, a first throw coupled to the first throw of the SPTT switching device, and a second throw coupled to the second ports of the first and second Marchand baluns, respectively; and a second SPDT switching device including a pole configured to couple to the second communication device, a first throw coupled to the third throw of the SPTT switching device, and a second throw coupled to the fourth and third ports of the first and second Marchand baluns, respectively.

Aspect 30: The apparatus of aspect 29, further comprising: a first impedance matching circuit coupled between the second throw of the first SPDT switching device and the second ports of the first and second Marchand baluns, respectively; and a second impedance matching circuit coupled between the second throw of the second SPDT switching device and the fourth and third ports of the first and second Marchand baluns, respectively.

Aspect 31: The apparatus of any one of aspects 19-30, wherein the first communication device is configured to transmit and/or receive signals within a first communication band, wherein the second communication device is configured to transmit and/or receive signals within a second communication band, wherein the first and second communication bands overlap in frequency.

Aspect 32: The apparatus of any one of aspects 19-31, wherein the first communication device is configured to transmit and/or receive signals in accordance with a first communication protocol, wherein the second communication device is configured to transmit and/or receive signals in accordance with a second communication protocol different than or same as the first communication protocol.

Aspect 33: The apparatus of aspect 32, wherein the first and second communication protocols include any of the following: a wireless wide area network (WWAN) communication protocol, a wireless local area network (WLAN) communication protocol, an ultra-wideband (UWB) communication protocols, or a Bluetooth communication protocol.

Aspect 34: The apparatus of any one of aspects 19-33, wherein the first and second communication devices each comprises a transceiver, a transmitter, or a receiver.

Aspect 35: An antenna interface, comprising: first, second, third, and fourth ports configured to couple to first, second, third, and fourth devices, respectively; a first transformer including a first primary winding and a first secondary winding, wherein the first primary winding includes first and second ends coupled to the third port and a reference potential electrode, respectively, and wherein the first secondary winding includes first and second ends coupled to the second port and the first port, respectively; and a second transformer including a second primary winding and a second secondary winding, wherein the second primary winding includes first and second ends coupled to the third port and the reference potential electrode, respectively, and wherein the second secondary winding includes first and second ends coupled to the first port and the fourth port, respectively.

Aspect 36: The antenna interface of aspect 35, wherein: the first device is a first communication device, the second device is an antenna, the third device is a second communication device, and the fourth device is a ballast load.

Aspect 37: The antenna interface of aspect 35, wherein: the first device is a first communication device, the second device is ballast load, the third device is a second communication device, and the fourth device is an antenna.

Aspect 38: The antenna interface of aspect 35, wherein: the first device is a ballast load, the second device is a first communication device, the third device is an antenna, and the fourth device is a second communication device.

Aspect 39: The antenna interface of aspect 35, wherein: the first device is an antenna, the second device is a first communication device, the third device is ballast load, and the fourth device is a second communication device.

Aspect 40: An antenna interface, comprising: a first Marchand balun including a first port that terminates at an open circuit, a second port configured to couple to a third device, a third port configured to couple to a second device, and a fourth port configured to couple to a first device; and a second Marchand balun including a first port that terminates at an open circuit, a second port configured to couple to the third device, a third port configured to couple to the first device, and a fourth port configured to couple to a fourth device.

Aspect 41: The antenna interface of aspect 40, wherein: the first device is a first communication device, the second device is an antenna, the third device is a second communication device, and the fourth device is a ballast load.

Aspect 42: The antenna interface of aspect 40, wherein: the first device is a first communication device, the second device is ballast load, the third device is a second communication device, and the fourth device is an antenna.

Aspect 43: The antenna interface of aspect 40, wherein: the first device is a ballast load, the second device is a first communication device, the third device is an antenna, and the fourth device is a second communication device.

Aspect 44: The antenna interface of aspect 40, wherein: the first device is an antenna, the second device is a first communication device, the third device is ballast load, and the fourth device is a second communication device.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:

an antenna interface, comprising:

a first transformer including a first transmission line and a second transmission line coupled to the first transmission line, wherein the first transmission line includes first and second ends configured to couple to a first communication device and a reference potential electrode, respectively, and wherein the second transmission line includes first and second ends configured to couple to an antenna and a second communication device, respectively; and a second transformer including a third transmission line and a fourth transmission line coupled to the third transmission line, wherein the third transmission line includes first and second ends configured to couple to the first communication device and the reference potential electrode, respectively, and wherein the fourth transmission line includes first and second ends configured to couple to the second communication device and a ballast load, respectively.

2. The apparatus of claim 1, wherein the first transformer is asymmetrical with respect to the second transformer in that a width of the first or second transmission line differs from a width of the third or fourth transmission line, respectively.

3. The apparatus of claim 1, wherein the first transformer is asymmetrical with respect to the second transformer in that a width of the first or second transmission line is greater than a width of the third or fourth transmission line, respectively.

4. The apparatus of claim 1, wherein the first transformer is asymmetrical with respect to the second transformer in that a width of the first or second transmission line is greater than a width of the third or fourth transmission line by at least 25 percent, respectively.

5. The apparatus of claim 1, wherein the first transformer is asymmetrical with respect to the second transformer in that a length of the first or second transmission line differs from a length of the third or fourth transmission line, respectively.

6. The apparatus of claim 1, wherein the first transformer is asymmetrical with respect to the second transformer in that a length of the first or second transmission line is greater than a length of the third or fourth transmission line, respectively.

7. The apparatus of claim 1, wherein the antenna interface further comprises:

a first capacitor coupled across the first and second ends of the second transmission line; and a second capacitor coupled across the first and second ends of the fourth transmission line.

8. The apparatus of claim 1, further comprising:

the first communication device; and an impedance matching circuit coupled between the first communication device and the first ends of the first and third transmission lines, respectively.

9. The apparatus of claim 8, wherein the impedance matching circuit comprises a shunt inductor and a series capacitor.

10. The apparatus of claim 1, further comprising:

the second communication device; and an impedance matching circuit coupled between the second communication device and the second and first ends of the second and fourth transmission lines, respectively.

11. The apparatus of claim 10, wherein the impedance matching circuit comprises a shunt inductor and a series capacitor.

12. The apparatus of claim 1, further comprising a set of one or more switching devices configured to:

couple an active one of the first or second communication device to the antenna while bypassing the antenna interface, and substantially isolate an inactive one of the first or second communication device from the antenna in accordance with a first mode of operation; or couple the first and second communication devices to the antenna via the antenna interface when both are active in accordance with a second mode of operation.

13. The apparatus of claim 12, wherein the set of one or more switching devices comprises:

a single-pole-triple throw (SPTT) switching device including a pole configured to couple to the antenna, a first throw, a second throw coupled to the first end of the second transmission line, and a third throw;

a first single-pole-double-throw (SPDT) switching device including a pole configured to couple to the first communication device, a first throw coupled to the first throw of the SPTT switching device, and a second throw coupled to the first ends of the first and third transmission lines, respectively; and a second SPDT switching device including a pole configured to couple to the second communication device, a first throw coupled to the third throw of the SPTT switching device, and a second throw coupled to the second and first ends of the second and fourth transmission lines, respectively.

14. The apparatus of claim 13, further comprising:

a first impedance matching circuit coupled between the second throw of the first SPDT switching device and the first ends of the first and third transmission lines, respectively; and a second impedance matching circuit coupled between the second throw of the second SPDT switching device and the second and first ends of the second and fourth transmission lines, respectively.

15. The apparatus of claim 1, wherein the first communication device is configured to transmit and/or receive signals within a first communication band, wherein the second communication device is configured to transmit and/or receive signals within a second communication band, wherein the first and second communication bands overlap in frequency.

16. The apparatus of claim 1, wherein the first communication device is configured to transmit and/or receive signals in accordance with a first communication protocol, wherein the second communication device is configured to transmit and/or receive signals in accordance with a second communication protocol different than or same as the first communication protocol.

17. The apparatus of claim 16, wherein the first and second communication protocols include any of the following: a wireless wide area network (WWAN) communication protocol, a wireless local area network (WLAN) communication protocols an ultra-wideband (UWB) communication protocol, or a Bluetooth communication protocol.

18. The apparatus of claim 1, wherein the first and second communication devices each comprises a transceiver, a transmitter, or a receiver.

19. An apparatus, comprising:

an antenna interface, comprising:

a first Marchand balun including a first port that terminates at an open circuit, a second port configured to couple to a first communication device, a third port configured to couple to an antenna, and a fourth port configured to couple to a second communication device; and a second Marchand balun including a first port that terminates at an open circuit, a second port configured to couple to the first communication device, a third port configured to couple to the second communication device, and a fourth port configured to couple to a ballast load.

20. The apparatus of claim 19, wherein each of the first or second Marchand balun comprises:

first and second inductors coupled in series between the first port and the second port;

a third inductor coupled between a reference potential electrode and the third port, wherein the third inductor is electromagnetically coupled to the first inductor; and a fourth inductor coupled between the fourth port and the reference potential electrode, wherein the fourth inductor is electromagnetically coupled to the second inductor.

21. The apparatus of claim 19, wherein each of the first or second Marchand balun comprises:

first and second transmission lines coupled in series between the first port and the second port;

a third transmission line coupled between a reference potential electrode and the third port, wherein the third transmission line is coupled to the first transmission line; and a fourth transmission line coupled between the fourth port and the reference potential electrode, wherein the fourth transmission line is coupled to the second transmission line.

22. The apparatus of claim 21, wherein the first and second communication devices are configured to process signals within first and second communication bands, respectively, wherein the first, second, third, and fourth transmission lines each have a length corresponding to a quarter wavelength associated with a frequency within the first and/or second communication band.

23. The apparatus of claim 21, wherein the first and second communication devices are configured to process signals within first and second communication bands, respectively, wherein the first, second, third, and fourth transmission lines each have a length corresponding to a quarter wavelength associated with a frequency within an overlapping frequency range of or between the first and second communication bands.

24. The apparatus of claim 19, further comprising:

the first communication device; and an impedance matching circuit coupled between the first communication device and the second ports of the first and second Marchand baluns, respectively.

25. The apparatus of claim 24, wherein the impedance matching circuit comprises a shunt capacitor and a pair of series inductors coupled between the first communication device and the second ports of the first and second Marchand baluns, respectively.

26. The apparatus of claim 19, further comprising:

the second communication device; and an impedance matching circuit coupled between the second communication device and the fourth and third ports of the first and second Marchand baluns, respectively.

27. The apparatus of claim 26, wherein the impedance matching circuit comprises a shunt inductor and a series capacitor.

28. The apparatus of claim 19, further comprising a set of one or more switching devices configured to:

couple an active one of the first or second communication device to the antenna while bypassing the antenna interface, and substantially isolate an inactive one of the first or second communication device from the antenna in accordance with a first mode of operation; or couple the first and second communication devices to the antenna interface when both are active in accordance with a second mode of operation.

29. The apparatus of claim 28, wherein the set of one or more switching devices comprises:

a single-pole-triple throw (SPTT) switching device including a pole configured to couple to the antenna, a first throw, a second throw coupled to the third port of the first Marchand balun, and a third throw;

a first single-pole-double-throw (SPDT) switching device including a pole configured to couple to the first communication device, a first throw coupled to the first throw of the SPTT switching device, and a second throw coupled to the second ports of the first and second Marchand baluns, respectively; and a second SPDT switching device including a pole configured to couple to the second communication device, a first throw coupled to the third throw of the SPTT switching device, and a second throw coupled to the fourth and third ports of the first and second Marchand baluns, respectively.

30. The apparatus of claim 29, further comprising:

a first impedance matching circuit coupled between the second throw of the first SPDT switching device and the second ports of the first and second Marchand baluns, respectively; and a second impedance matching circuit coupled between the second throw of the second SPDT switching device and the fourth and third ports of the first and second Marchand baluns, respectively.

31. The apparatus of claim 19, wherein the first communication device is configured to transmit and/or receive signals within a first communication band, wherein the second communication device is configured to transmit and/or receive signals within a second communication band, wherein the first and second communication bands overlap in frequency.

32. The apparatus of claim 19, wherein the first communication device is configured to transmit and/or receive signals in accordance with a first communication protocol, wherein the second communication device is configured to transmit and/or receive signals in accordance with a second communication protocol different than or same as the first communication protocol.

33. The apparatus of claim 32, wherein the first and second communication protocols include any of the following: a wireless wide area network (WWAN) communication protocol, a wireless local area network (WLAN) communication protocol, an ultra-wideband (UWB) communication protocol, or a Bluetooth communication protocol.

34. The apparatus of claim 19, wherein the first and second communication devices each comprises a transceiver, a transmitter, or a receiver.

35. An antenna interface, comprising:

first, second, third, and fourth ports configured to couple to first, second, third, and fourth devices, respectively;

a first transformer including a first primary winding and a first secondary winding, wherein the first primary winding includes first and second ends coupled to the third port and a reference potential electrode, respectively, and wherein the first secondary winding includes first and second ends coupled to the second port and the first port, respectively; and a second transformer including a second primary winding and a second secondary winding, wherein the second primary winding includes first and second ends coupled to the third port and the reference potential electrode, respectively, and wherein the second secondary winding includes first and second ends coupled to the first port and the fourth port, respectively.

36. The antenna interface of claim 35, wherein: the first device is a first communication device, the second device is an antenna, the third device is a second communication device, and the fourth device is a ballast load.

37. The antenna interface of claim 35, wherein: the first device is a first communication device, the second device is ballast load, the third device is a second communication device, and the fourth device is an antenna.

38. The antenna interface of claim 35, wherein: the first device is a ballast load, the second device is a first communication device, the third device is an antenna, and the fourth device is a second communication device.

39. The antenna interface of claim 35, wherein: the first device is an antenna, the second device is a first communication device, the third device is ballast load, and the fourth device is a second communication device.

* * * * *